US010087401B2

(12) United States Patent
Lee et al.

(10) Patent No.: US 10,087,401 B2
(45) Date of Patent: Oct. 2, 2018

(54) WATER SOLUBLE COMPOSITIONS INCORPORATING ENZYMES, AND METHOD OF MAKING SAME

(75) Inventors: David M. Lee, Crown Point, IN (US); Jennifer L. Sims, Lowell, IN (US)

(73) Assignee: MONOSOL, LLC, Merrillville, IN (US)

( * ) Notice: Subject to any disclaimer, the term of this patent is extended or adjusted under 35 U.S.C. 154(b) by 0 days.

(21) Appl. No.: 13/422,709

(22) Filed: Mar. 16, 2012

(65) Prior Publication Data

US 2013/0244920 A1 Sep. 19, 2013

(51) Int. Cl.

| | |
|---|---|
| ***B32B 5/16*** | (2006.01) |
| ***C11D 3/20*** | (2006.01) |
| ***C11D 3/22*** | (2006.01) |
| ***C11D 3/37*** | (2006.01) |
| ***C11D 3/38*** | (2006.01) |
| ***C11D 3/386*** | (2006.01) |
| ***C11D 17/04*** | (2006.01) |

(52) U.S. Cl.

CPC ............ *C11D 3/2093* (2013.01); *C11D 3/222* (2013.01); *C11D 3/225* (2013.01); *C11D 3/378* (2013.01); *C11D 3/3761* (2013.01); *C11D 3/38* (2013.01); *C11D 3/38609* (2013.01); *C11D 3/38627* (2013.01); *C11D 3/38636* (2013.01); *C11D 3/38645* (2013.01); *C11D 17/042* (2013.01)

(58) Field of Classification Search

CPC .............. B32B 5/16; C11D 3/60; C11D 17/08
USPC ................................................. 428/323, 35.2
See application file for complete search history.

(56) References Cited

U.S. PATENT DOCUMENTS

| | | | |
|---|---|---|---|
| 3,186,869 | A | 6/1965 | Friedman |
| 3,728,739 | A | 4/1973 | Semp |
| 3,762,454 | A | 10/1973 | Wilkins, Jr. |
| 4,062,647 | A | 12/1977 | Storm et al. |
| 4,115,292 | A | 9/1978 | Richardson et al. |
| 4,115,922 | A | 9/1978 | Alderman |
| 4,176,079 | A | 11/1979 | Guerry et al. |
| 4,291,071 | A | 9/1981 | Harris et al. |
| 4,375,416 | A | 3/1983 | Crisp et al. |
| 4,435,307 | A | 3/1984 | Barbesgaard et al. |
| 4,534,981 | A | 8/1985 | Zabotto et al. |
| 4,664,064 | A | 5/1987 | Lowe |
| 4,749,653 | A | 6/1988 | Lee et al. |
| 4,760,025 | A | 7/1988 | Estell et al. |
| 4,810,414 | A | 3/1989 | Huge-Jensen et al. |
| 5,002,789 | A | 3/1991 | Graf et al. |
| 5,102,950 | A | 4/1992 | Terada et al. |
| 5,112,688 | A | 5/1992 | Michael |
| 5,145,842 | A | 9/1992 | Driedger et al. |
| 5,155,033 | A | 10/1992 | Estell et al. |
| 5,182,204 | A | 1/1993 | Estell et al. |
| 5,185,258 | A | 2/1993 | Caldwell et al. |
| 5,204,015 | A | 4/1993 | Caldwell et al. |
| 5,232,612 | A | 8/1993 | Trinh et al. |
| 5,244,791 | A | 9/1993 | Estell |
| 5,264,366 | A | 11/1993 | Ferrari et al. |
| 5,288,627 | A | 2/1994 | Nielsen et al. |
| 5,290,694 | A | 3/1994 | Nakanishi et al. |
| RE34,606 | E | 5/1994 | Estell et al. |
| 5,310,675 | A | 5/1994 | Estell et al. |
| 5,316,941 | A | 5/1994 | Estell et al. |
| 5,346,823 | A | 9/1994 | Estell et al. |
| 5,352,594 | A | 10/1994 | Poulouse |
| 5,371,008 | A | 12/1994 | Carter et al. |
| 5,371,190 | A | 12/1994 | Carter et al. |
| 5,384,364 | A | 1/1995 | Besse et al. |
| 5,411,873 | A | 5/1995 | Adams et al. |
| 5,427,936 | A | 6/1995 | Moeller et al. |
| 5,441,882 | A | 8/1995 | Estell et al. |
| 5,443,750 | A | 8/1995 | Convents et al. |
| 5,457,046 | A | 10/1995 | Woldike et al. |
| 5,472,855 | A | 12/1995 | Carter et al. |
| 5,520,838 | A | 5/1996 | Baeck et al. |
| 5,536,661 | A | 7/1996 | Boel et al. |
| 5,648,096 | A | 7/1997 | Gander et al. |
| 5,648,263 | A | 7/1997 | Schulein et al. |
| 5,652,136 | A | 7/1997 | Carter et al. |
| 5,658,871 | A | 8/1997 | Batenburg et al. |
| 5,668,073 | A | 9/1997 | Convents et al. |
| 5,686,593 | A | 11/1997 | Woldike et al. |
| 5,691,178 | A | 11/1997 | Schulein et al. |
| 5,693,520 | A | 12/1997 | Branner et al. |
| 5,700,676 | A | 12/1997 | Bott et al. |
| 5,763,254 | A | 6/1998 | Woldike et al. |
| 5,763,257 | A | 6/1998 | Bott et al. |
| 5,766,912 | A | 6/1998 | Boel et al. |
| 5,776,757 | A | 7/1998 | Schulein et al. |
| 5,792,641 | A | 8/1998 | Schulein et al. |

(Continued)

FOREIGN PATENT DOCUMENTS

| | | | | |
|---|---|---|---|---|
| CA | 2301156 A1 * | 2/1999 | .......... | C11D 3/0036 |
| EP | 0218272 A1 | 4/1987 | | |

(Continued)

OTHER PUBLICATIONS

Xu (ed.), Fermentation Engineering, lines 1-3, second paragraph p. 310 (English translation), Beijing, China: Higher Education Press (Jun. 2011).

(Continued)

*Primary Examiner* — Gregory R Delcotto
*Assistant Examiner* — Preeti Kumar
(74) *Attorney, Agent, or Firm* — Marshall, Gerstein & Borun LLP

(57) ABSTRACT

Disclosed herein are water soluble compositions, such as films, including a mixture of a first water-soluble resin, an enzyme, and an enzyme stabilizer which comprises a functional substrate for the enzyme, methods of making such compositions, and methods of using such compositions, e.g. to make packets containing functional ingredients. The enzymes can include proteases and mixtures of proteases with other enzymes, and the compositions provide good retention of enzyme function following film processing and storage.

18 Claims, No Drawings

(56) References Cited

U.S. PATENT DOCUMENTS 5,801,038 A 9/1998 Bott et al.
5,824,532 A 10/1998 Barnett et al.
5,827,718 A 10/1998 Ishida et al.
5,849,549 A 12/1998 Barnett et al.
5,858,757 A 1/1999 Von Der Osten et al.
5,863,759 A 1/1999 Boel et al.
5,869,438 A 2/1999 Svendsen et al.
5,874,558 A 2/1999 Boel et al.
5,892,013 A 4/1999 Svendsen et al.
5,912,157 A 6/1999 von der Osten et al.
5,919,691 A 7/1999 Schulein et al.
5,939,315 A 8/1999 Adams et al.
5,942,431 A 8/1999 Yoneda et al.
5,948,672 A 9/1999 Rasmussen et al.
5,955,340 A 9/1999 Bott et al.
5,965,384 A 10/1999 Boel et al.
5,972,682 A 10/1999 Bott et al.
5,976,855 A 11/1999 Svendsen et al.
6,001,639 A 12/1999 Schulein et al.
6,020,180 A 2/2000 Svendsen et al.
6,037,319 A 3/2000 Dickler et al.
6,071,735 A 6/2000 Schulein et al.
6,074,863 A 6/2000 Svendsen et al.
6,093,562 A 7/2000 Bisgård-Frantzen et al.
6,114,296 A 9/2000 Schulein et al.
6,117,664 A 9/2000 Schulein et al.
6,136,776 A 10/2000 Dickler et al.
6,159,731 A 12/2000 Yang et al.
6,297,037 B1 10/2001 Barnett et al.
6,297,038 B1 10/2001 Bisgård-Frantzen et al.
6,300,116 B1 10/2001 von der Osten et al.
6,387,690 B1 5/2002 Schulein et al.
6,423,524 B1 7/2002 Hagen et al.
6,458,754 B1 10/2002 Velazquez et al.
6,465,235 B1 10/2002 Bott et al.
6,485,736 B1 11/2002 Shirley et al.
6,506,589 B1 1/2003 Hastrup et al.
6,579,843 B2 6/2003 Cropper et al.
6,808,913 B2 10/2004 Hastrup et al.
6,835,821 B2 12/2004 Hastrup et al.
6,844,302 B1 1/2005 Boden et al.
6,855,531 B2 2/2005 Shulein et al.
6,867,031 B2 3/2005 Bisgard-Frantzen et al.
6,924,258 B2 8/2005 Delamarche et al.
7,067,575 B2 6/2006 Kitamura et al.
7,098,017 B2 8/2006 von der Osten et al.
7,226,773 B2 6/2007 Schulein et al.
7,357,891 B2 4/2008 Yang et al.
7,517,668 B1 4/2009 Boel et al.
7,517,847 B2 4/2009 Catalfamo et al.
7,666,337 B2 2/2010 Yang et al.
7,824,588 B2 11/2010 Yang et al.
7,871,972 B2 1/2011 SenGupta
7,908,992 B2 3/2011 Rowe et al.
7,977,288 B2 7/2011 SenGupta
7,993,898 B2 8/2011 Andersen et al.
8,017,372 B2 9/2011 Andersen et al.
9,394,092 B2 7/2016 Lee et al.
2001/0036910 A1 11/2001 Rasmussen et al.
2002/0098996 A1 7/2002 Bisgard-Frantzen et al.
2002/0102702 A1 8/2002 Osten et al.
2002/0165109 A1 11/2002 Cropper et al.
2003/0054539 A1 3/2003 Schulein et al.
2003/0064908 A1 4/2003 Bisgard-Frantzen et al.
2003/0092097 A1 5/2003 Andersen et al.
2003/0100463 A1 5/2003 Delamarche et al.
2003/0119167 A1 6/2003 Rasmussen et al.
2003/0148495 A1 8/2003 Hastrup et al.
2003/0175933 A1 9/2003 Hastrup et al.
2003/0186378 A1 10/2003 Hastrup et al.
2003/0232076 A1 12/2003 Makino et al.
2004/0120991 A1* 6/2004 Gardner ............... A61K 9/0056 424/443
2004/0180086 A1 9/2004 Ramtoola et al.
2004/0253676 A1 12/2004 Bisgard-Frantzen et al.
2005/0003986 A1 1/2005 Hastrup et al.
2005/0009166 A1 1/2005 Andersen et al.
2005/0059131 A1 3/2005 Bisgard-Frantzen et al.
2005/0070003 A1 3/2005 Schulein et al.
2005/0187137 A1* 8/2005 Pegelow .................. C11D 3/06 510/510
2005/0250664 A1 11/2005 Bisgard-Frantzen et al.
2006/0035323 A2 2/2006 Bisgard Frantzen et al.
2006/0083876 A1 4/2006 Catlin et al.
2007/0264487 A1* 11/2007 Georgiades .................. 428/323
2008/0020220 A1 1/2008 Maurer et al.
2008/0145912 A1 6/2008 Schulein et al.
2008/0206836 A1 8/2008 Andersen et al.
2009/0170747 A1 7/2009 Andersen et al.
2009/0280527 A1 11/2009 Bisgard-Frantzen et al.
2010/0099597 A1 4/2010 Bisgard-Frantzen et al.
2010/0099598 A1 4/2010 Bisgard-Frantzen et al.
2010/0105821 A1 4/2010 Verrall et al.
2010/0107342 A1 5/2010 Schulein et al.
2010/0305020 A1 12/2010 Jennewein
2011/0039985 A1 2/2011 Patel et al.
2011/0177990 A1 7/2011 Bisgard-Frantzen et al.
2011/0250674 A1 10/2011 Andersen et al.
2011/0305768 A1* 12/2011 Mao ....................... A61K 39/15 424/499
2011/0319310 A1* 12/2011 Labeque ................ C11D 3/227 510/296
2013/0244920 A1 9/2013 Lee et al.
2016/0326325 A1 11/2016 Lee et al.

FOREIGN PATENT DOCUMENTS

EP 0258068 A2 3/1988
EP 0260105 A2 3/1988
EP 0305216 A1 3/1989
EP 0331376 A2 9/1989
EP 0 338 350 A2 10/1989
EP 0407225 A1 1/1991
EP 0495257 A1 7/1992
EP 0531315 A1 3/1993
EP 0531372 A1 3/1993
EP 1314653 A1 5/2003
EP 1498473 A1 1/2005
EP 2133410 A1 12/2009
EP 2258820 A1 12/2010
EP 1 907 524 B1 3/2012
EP 1326929 B9 3/2012
GB 1296839 A 11/1972
GB 1372034 A 10/1974
JP S51-006726 A 1/1976
JP S63-112510 A 5/1988
JP 1074992 A 3/1989
JP H02124945 A 5/1990
JP H9150407 A 6/1997
JP 2001-162708 A 6/2001
JP 2004-529243 A 9/2004
JP 2008-007749 A 1/2008
JP 2008-540743 A 11/2008
KR 2007-0060701 A 6/2007
TW 200914249 A 4/2009
TW M401635 U 4/2011
WO WO-89/06270 A1 7/1989
WO WO-89/06279 A1 7/1989
WO WO-89/09259 A1 10/1989
WO WO-91/16422 A1 10/1991
WO WO-92/05249 A1 4/1992
WO WO-92/19729 A1 11/1992
WO WO-94/01541 A1 1/1994
WO WO-94/02597 A1 2/1994
WO WO-94/07998 A1 4/1994
WO WO-94/18314 A1 8/1994
WO WO-94/25578 A1 11/1994
WO WO-94/25583 A1 11/1994
WO WO-95/06720 A1 3/1995
WO WO-95/14783 A1 6/1995
WO WO-95/22615 A1 8/1995

(56) References Cited

FOREIGN PATENT DOCUMENTS

| | | | |
|---|---|---|---|
| WO | WO-95/24471 | A1 | 9/1995 |
| WO | WO-95/30744 | A2 | 11/1995 |
| WO | WO-95/35381 | A1 | 12/1995 |
| WO | WO-96/00292 | A1 | 1/1996 |
| WO | WO-96/11262 | A1 | 4/1996 |
| WO | WO-96/12012 | A1 | 4/1996 |
| WO | WO-96/13580 | A1 | 5/1996 |
| WO | WO-96/23873 | A1 | 8/1996 |
| WO | WO-96/27002 | A1 | 9/1996 |
| WO | WO-96/29397 | A1 | 9/1996 |
| WO | WO-97/04079 | A1 | 2/1997 |
| WO | WO-97/07202 | A1 | 2/1997 |
| WO | WO-97/24427 | A1 | 7/1997 |
| WO | WO-97/43424 | A1 | 11/1997 |
| WO | WO-98/08940 | A1 | 3/1998 |
| WO | WO-98/12307 | A1 | 3/1998 |
| WO | WO-98/20115 | A1 | 5/1998 |
| WO | WO-98/20116 | A1 | 5/1998 |
| WO | WO-98/34946 | A1 | 8/1998 |
| WO | WO-99/001544 | A1 | 1/1999 |
| WO | WO-00/27367 | A1 | 5/2000 |
| WO | WO-00/42992 | A2 | 7/2000 |
| WO | WO-00/060063 | A1 | 10/2000 |
| WO | WO-02/090486 | A1 | 11/2002 |
| WO | WO-03/041667 | A2 | 5/2003 |
| WO | WO-2004/108917 | A1 | 12/2004 |
| WO | WO-2007/010553 | A2 | 1/2007 |
| WO | WO-2007/087508 | A2 | 8/2007 |
| WO | WO-2008/114171 | A1 | 9/2008 |
| WO | WO-2009/109500 | A1 | 9/2009 |
| WO | WO-2009/152031 | A1 | 12/2009 |
| WO | WO-2011/026171 | A1 | 3/2011 |
| WO | WO-2011/163428 | A1 | 12/2011 |

OTHER PUBLICATIONS

Notification of the First Office Action (with English translation), Chinese patent application No. 201380014651.X (dated Oct. 9, 2016).

Office Action of the Intellectual Property Office, Taiwanese patent application No. 102108343 (dated Jul. 12, 2016).

Wang et al. (eds.), Oil Field Chemicals Handbook, pp. 29-30 (Chinese only), Beijing, China: China Petrochemical Press (Jul. 2004).

Xu (ed.), Fermentation Engineering, lines 1-3, second paragraph p. 310 (Chinese only), Beijing, China: Higher Education Press (Jun. 2011).

International Search Report and Written Opinion for Application No. PCT/US2013/030403, dated Jul. 30, 2013.

Dartois et al., Cloning, nucleotide sequence and expression in *Escherichia coli* of a lipase gene from Bacillus subtilis 168, Biochemica et Biophysica Acta—Gene Structure and Expression, 1131(3):253-60 (1992).

Dave et al., Entrapment of lipase in polymer of polyvinyl alcohol-boric acid for esterification in organic media, Indian J. Biotechnol., 5:368-72 (2006).

Su et al., Heat-sealing properties of soy protein isolate/poly(vinyl alcohol) blend films: effect of the heat-sealing temperature, J. Appl. Polym. Sci., 115:1901-11 (2010).

"BonuWax™ Anti-Sticking Agent," BIOGRUND GmbH, Germany (2013).

Dartois et al., Cloning, nucleotide sequence and expression in *Escherichia coli* of a lipase gene from Bacillus subtilis 168 Biochim. Biophys. Acta, 1131(3):253-60 (1992), Zhang et al., Microencapsulation technology and application thereof in detergent, Surfactant Soap and Detergent, Issue 6, pp. 56-8 (2009).

Korean patent application No. 10-2014-7028929, Office Action (English Translation), dated Jun. 20, 2018.

* cited by examiner

WATER SOLUBLE COMPOSITIONS INCORPORATING ENZYMES, AND METHOD OF MAKING SAME

FIELD OF THE DISCLOSURE

The present disclosure relates generally to water-soluble films. More particularly, the disclosure relates to water soluble films comprising a mixture of a first water-soluble resin, an enzyme, and an enzyme stabilizer which comprises a functional substrate for the enzyme.

BACKGROUND

Water-soluble films are well known in the art. Water-soluble films have many applications, such as packaging materials, wherein the film itself can make up a water soluble packet. These compositions have the advantage that they are easy to dose, handle, transport and store.

Water-soluble packets are well suited for single dose applications wherein the packet encloses a laundry detergent, bleach or other laundry additives, fabric care, dishwashing, hard surface cleaning, beauty care, skin care, other personal care, or food product compositions. Often enclosed in water-soluble packets are active agents that may become unstable in the presence of other active agents, or may cause other ingredients to become unstable, thereby limiting what active agents can be prepackaged together in a single dose form.

The activity of enzymes in previously-known films tended to be low and to decrease with storage time. This loss of activity tended to be especially severe when the enzyme composition included a protease, as the protease can break down itself or other enzymes. In an attempt to compensate for the decrease in enzymatic activity, a large concentration of enzyme had been included in film compositions, and this approach was not always successful in producing a film with at least a moderate activity. Accordingly, it is highly desirable to produce a film that maintains a high level of enzyme activity without requiring starting with a high concentration of enzyme (i.e., high enzyme percent recovery after processing and storage).

Active agents often used as additives in laundry and dishwashing applications include enzymes such as protease, amylase, lipase, and oxido-reductase enzymes, including but not limited to oxido-reductase enzymes that catalyze the formation of bleaching agents. Therefore, a water-soluble film containing enzymes that maintain a high level of activity, especially in the presence of protease, would be advantageous for use in water-soluble single dose packets enclosing detergents or other laundry or dishwashing additives.

SUMMARY

One aspect of the disclosure is a water-soluble composition including a water-soluble mixture of a first water-soluble resin, an enzyme, and an enzyme substrate. The composition can take the form of a film, for example.

Another aspect of the disclosure is a water-soluble composition (e.g., a film) including a water-soluble mixture of a water-soluble resin comprising acrylamido-2-methylpropanesulfonate, and an enzyme, wherein the enzyme activity recovery is at least 87% following film formation.

Another aspect of the disclosure is a method of forming a water-soluble film, including the steps of providing a water soluble mixture according to the disclosure dissolved in water; casting the water soluble mixture onto a surface preheated to a temperature less than 77° C., optionally in a range of about 66° C. to about 77° C., or about 74° C.; drying the water from the cast mixture over a period of less than 24 hours, optionally less than 12 hours, optionally less than 8 hours, optionally less than 2 hours, optionally less than 1 hour, optionally less than 45 minutes, optionally less than 30 minutes, optionally less than 20 minutes, optionally less than 10 minutes, for example in a range of about 6 minutes to about 10 minutes, or 8 minutes, to form a water soluble film.

Another aspect of the disclosure is a method of forming a water-soluble film, wherein the water soluble film is cast from a water-soluble mixture prepared according to the steps of:

providing a mixture of water soluble resin, water, and any optional additives excluding enzymes; boiling the mixture for 30 minutes; degassing the mixture in an oven at a temperature of at least 40° C.; optionally in a range of 40° C. to 70° C., e.g. about 65° C.; adding at least one enzyme, optionally at least one plasticizer, and optionally additional water to the mixture at a temperature of 65° C. or less; and stirring the mixture, optionally without vortex, until the mixture appears substantially uniform in color and consistency; optionally for a time period in a range of 30 minutes to 90 minutes, optionally at least 1 hour; and casting the mixture promptly after the time period of stirring, e.g., within 4 hours, or 2 hours, or within 1 hour or less.

Optionally, the water-soluble films described herein can be thermoformable, for example into a pouch.

While the present disclosure provides film examples, the compositions can take other forms and shapes, including those having thicknesses substantially in excess of what would normally be considered a film.

For the compositions and methods described herein, optional features, including but not limited to components, compositional ranges thereof, substituents, conditions, and steps, are contemplated to be selected from the various aspects, embodiments, and examples provided herein.

Further aspects and advantages will be apparent to those of ordinary skill in the art from a review of the following detailed description. While the compositions and methods are susceptible of embodiments in various forms, the description hereafter includes specific embodiments with the understanding that the disclosure is illustrative, and is not intended to limit the invention to the specific embodiments described herein.

DETAILED DESCRIPTION

Disclosed herein are water-soluble compositions (e.g., films) including a water-soluble mixture of a first water-soluble resin, an enzyme, and an enzyme stabilizer which is a functional substrate for the enzyme. Optionally, the water-soluble films include two or more types of enzymes. The water-soluble films of one aspect of the disclosure can be particularly advantageous in that they can be designed such that a high percentage of enzymes remain active following film formation. The water-soluble films according to the disclosure can optionally be designed such that a high percentage of enzymes remain active when the film is stored at temperatures in a range of about 5° C. to about 45° C. for at least 2 weeks, or in a range of about 2 weeks to 2 years, e.g., 3 months. The water-soluble films of the disclosure herein can have one or more other, optional advantages including unexpectedly high recovery of enzyme activity in films containing a protease and a second enzyme, thermoformable (e.g., into a pouch or packet), a solid form for delivery of enzymes to a substrate that is dust free.

The films, packets, and their methods of manufacture and use are contemplated to include embodiments including any combination of one or more of the additional optional elements, features, and steps further described below (including those shown in any figures), unless stated otherwise.

As used herein, the term "comprising" indicates the potential inclusion of other agents, elements, steps, or features, in addition to those specified.

As used herein and unless specified otherwise all measurements of viscosity in centipoise (cP) are of a 4% solution at 20° C.

As used herein, the "enzyme percent recovery" refers to the percentage of enzymes that remain active following one or more processing steps or storage time, e.g. following the water-soluble composition (e.g., film) processing steps (e.g. mixing, casting, and drying) and for a period of storage of about 1 month at about 5° C. Accordingly, as used herein, the "recovery of enzyme activity" or "enzyme activity recovery" refers to the activity of the enzymes in the water-soluble composition maintained following a process or storage time as compared to the original enzyme activity, e.g. the enzyme activity measured in a representative sample of the raw material enzyme composition that was added to a film. Thus, for example the enzyme activity recovery can be the ratio of enzyme activity following processing steps to make the composition, e.g. a film, and for a period of storage of about one month at about 5° C. to the enzyme activity of the original enzyme composition added to the film. Contemplated processing steps contemplated include each of the steps described herein, individually or in combinations, for example but not limited to a heating step, a dissolution step, a mixing step (e.g., a wet mixing step), and a drying step (e.g. optionally with application of heat). Enzyme activity can be measured by any suitable method, so long as the same or equivalent methods are used for the enzyme raw material measurement and the enzyme-loaded, processed composition (e.g., enzyme-containing film) measurement. In one type of embodiment, the enzyme activity can be determined by a colorometric method. Colorometric measurements for protease, amylase, and lipase activity are described below in connection with the experiments.

As used herein and unless specified otherwise, the terms "wt. %" and "wt %" are intended to refer to the composition of the identified element in "dry" (non water) parts by weight of the entire film (when applicable) or parts by weight of the entire composition enclosed within a pouch (when applicable). As used herein and unless specified otherwise, the term "phr" is intended to refer to the composition of the identified element in parts per one hundred parts water-soluble resin, e.g. polyvinyl alcohol (PVOH) resin.

Water-soluble films, optional ingredients for use therein, and methods of making the same are well known in the art. In one class of embodiments, the water-soluble film includes PVOH. PVOH is a synthetic resin generally prepared by the alcoholysis, usually termed hydrolysis or saponification, of polyvinyl acetate. Fully hydrolyzed PVOH, wherein virtually all the acetate groups have been converted to alcohol groups, is a strongly hydrogen-bonded, highly crystalline polymer which dissolves only in hot water—greater than about 140° F. (60° C.). If a sufficient number of acetate groups are allowed to remain after the hydrolysis of polyvinyl acetate, the PVOH polymer then being known as partially hydrolyzed, it is more weakly hydrogen-bonded and less crystalline and is soluble in cold water—less than about 50° F. (10° C.). An intermediate cold/hot water soluble film can include, for example, intermediate partially-hydrolyzed PVOH (e.g., with degrees of hydrolysis of about 94% to about 98%), and is readily soluble only in warm water—e.g., rapid dissolution at temperatures of about 40° C. and greater. Both fully and partially hydrolyzed PVOH types are commonly referred to as PVOH homopolymers although the partially hydrolyzed type is technically a vinyl alcohol-vinyl acetate copolymer.

The degree of hydrolysis of the PVOH included in the water-soluble films of the present disclosure can be about 75% to about 99%. As the degree of hydrolysis is reduced, a film made from the resin will have reduced mechanical strength but faster solubility at temperatures below about 20° C. As the degree of hydrolysis increases, a film made from the resin will tend to be mechanically stronger and the thermoformability will tend to decrease. The degree of hydrolysis of the PVOH can be chosen such that the water-solubility of the resin is temperature dependent, and thus the solubility of a film made from the resin and additional ingredients is also influenced. In one class of embodiments the film is cold water-soluble. A cold water-soluble film, soluble in water at a temperature of less than 10° C., can include PVOH with a degree of hydrolysis in a range of about 75% to about 90%, or in a range of about 80% to about 90%, or in a range of about 85% to about 90%. In another class of embodiments the film is hot water-soluble. A hot water-soluble film, soluble in water at a temperature of at least about 60° C., can include PVOH with a degree of hydrolysis of at least about 98%.

Other film-forming resins for use in addition to or in an alternative to PVOH can include, but are not limited to, modified polyvinyl alcohols, polyacrylates, water-soluble acrylate copolymers, polyacryamides, polyvinyl pyrrolidone, pullulan, water-soluble natural polymers including, but not limited to, guar gum, xanthan gum, carrageenan, and starch, water-soluble polymer derivatives including, but not limited to, ethoxylated starch and hydroxypropylated starch, poly(sodium acrylamido-2-methylpropane sulfonate), polymonomethylmaleate, copolymers thereof, and combinations of any of the foregoing. In one class of embodiments, the film-forming resin is a terpolymer consisting of vinyl alcohol, vinyl acetate, and sodium acrylamido-2-methylpropanesulfonate. Unexpectedly, water-soluble films based on a vinyl alcohol, vinyl acetate, and sodium acrylamido-2-methylpropanesulfonate terpolymer have demonstrated a high percent recovery of enzyme activity, both with and without the inclusion of an enzyme substrate in the water-soluble film.

The water-soluble resin can be included in the water-soluble film in any suitable amount, for example an amount in a range of about 35 wt % to about 90 wt %. The preferred weight ratio of the amount of the water-soluble resin as compared to the combined amount of all enzymes, enzyme stabilizers, and secondary additives can be any suitable ratio, for example a ratio in a range of about 0.5 to about 5, or about 1 to 3, or about 1 to 2.

Water-soluble resins for use in the films described herein (including, but not limited to PVOH resins) can be characterized by any suitable viscosity for the desired film properties, optionally a viscosity in a range of about 5.0 to about 30.0 cP, or about 10.0 cP to about 25 cP. The viscosity of a PVOH resin is determined by measuring a freshly made solution using a Brookfield LV type viscometer with UL adapter as described in British Standard EN ISO 15023-2: 2006 Annex E Brookfield Test method. It is international practice to state the viscosity of 4% aqueous polyvinyl alcohol solutions at 20° C. All PVOH viscosities specified herein in cP should be understood to refer to the viscosity of 4% aqueous polyvinyl alcohol solution at 20° C., unless specified otherwise.

It is well known in the art that the viscosity of a PVOH resin is correlated with the weight average molecular weight ($\overline{M}w$) of the same PVOH resin, and often the viscosity is used as a proxy for $\overline{M}w$. Thus, the weight average molecular weight of the water-soluble resin optionally can be in a range of about 35,000 to about 190,000, or about 80,000 to about 160,000. The molecular weight of the resin need only be sufficient to enable it to be molded by suitable techniques to form a thin plastic film.

Enzymes

It is contemplated that any desired types of enzymes can be used in the films described herein.

For example, such enzymes include enzymes categorized in any one of the six conventional Enzyme Commission (EC) categories, i.e., the oxidoreductases of EC 1 (which catalyze oxidation/reduction reactions), the transferases of EC 2 (which transfer a functional group, e.g., a methyl or phosphate group), the hydrolases of EC 3 (which catalyze the hydrolysis of various bonds), the lyases of EC 4 (which cleave various bonds by means other than hydrolysis and oxidation), the isomerases of EC 5 (which catalyze isomerization changes within a molecule) and the ligases of EC 6 (which join two molecules with covalent bonds). Examples of such enzymes include dehydrogenases and oxidases in EC 1, transaminases and kinases in EC 2, lipases, cellulases, amylases, mannanases, and peptidases (a.k.a. proteases or proteolytic enzymes) in EC 3, decarboxylases in EC 4, isomerases and mutases in EC 5 and synthetases and synthases of EC 6.

Oxidoreductases

Oxidoreductases include, but are not limited to: those acting on the CH—OH group of donors; those acting on the aldehyde or oxo group of donors; those acting on the CH—CH group of donors; those acting on the CH—$NH_2$ group of donors; those acting on the CH—NH group of donors; those acting on NADH or NADPH; those acting on other nitrogenous compounds as donors; those acting on a sulfur group of donors; those acting on a heme group of donors; those acting on diphenols and related substances as donors; those acting on a peroxide as acceptor; those acting on hydrogen as donor; those acting on single donors with incorporation of molecular oxygen (oxygenases); those acting on paired donors, with incorporation or reduction of molecular oxygen; those acting on superoxide radicals as acceptor; those oxidizing metal ions; those acting on CH or $CH_2$ groups; those acting on iron-sulfur proteins as donors; those acting on reduced flavodoxin as donor; those acting on phosphorus or arsenic in donors; those acting on X—H and Y—H to form an X—Y bond; and those acting on halogen in donors.

The oxidoreductases which act on the CH—OH group of donors can include, but are not limited to, those with NAD+ or NADP+ as acceptor (including alcohol dehydrogenase, alcohol dehydrogenase ($NADP^+$), homoserine dehydrogenase, (R,R)-butanediol dehydrogenase, glycerol dehydrogenase, propanediol-phosphate dehydrogenase, glycerol-3-phosphate dehydrogenase ($NAD^+$), D-xylulose reductase, L-xylulose reductase, D-arabinitol 4-dehydrogenase, L-arabinitol 4-dehydrogenase, L-arabinitol 2-dehydrogenase, L-iditol 2-dehydrogenase, D-iditol 2-dehydrogenase, galactitol 2-dehydrogenase, mannitol-1-phosphate 5-dehydrogenase, inositol 2-dehydrogenase, glucuronate reductase, glucuronolactone reductase, aldehyde reductase, UDP-glucose 6-dehydrogenase, histidinol dehydrogenase, quinate dehydrogenase, shikimate dehydrogenase, glyoxylate reductase, L-lactate dehydrogenase, D-lactate dehydrogenase, glycerate dehydrogenase, 3-hydroxybutyrate dehydrogenase, 3-hydroxyisobutyrate dehydrogenase, mevaldate reductase, mevaldate reductase (NADPH), hydroxymethylglutaryl-CoA reductase (NADPH), 3-hydroxyacyl-CoA dehydrogenase, acetoacetyl-CoA reductase, malate dehydrogenase, malate dehydrogenase (oxaloacetate-decarboxylating), malate dehydrogenase (decarboxylating), malate dehydrogenase (oxaloacetate-decarboxylating) ($NADP^+$), isocitrate dehydrogenase ($NAD^+$), isocitrate dehydrogenase ($NADP^+$), phosphogluconate 2-dehydrogenase, phosphogluconate dehydrogenase (decarboxylating), L-gulonate 3-dehydrogenase, L-arabinose 1-dehydrogenase, glucose 1-dehydrogenase, galactose 1-dehydrogenase, glucose-6-phosphate dehydrogenase, 3α-hydroxysteroid dehydrogenase (B-specific), 3 (or 17)β-hydroxysteroid dehydrogenase, 3α-hydroxycholanate dehydrogenase, 3α(or 20β)-hydroxysteroid dehydrogenase, allyl-alcohol dehydrogenase, lactaldehyde reductase (NADPH), ribitol 2-dehydrogenase, fructuronate reductase, tagaturonate reductase, 3-hydroxypropionate dehydrogenase, 2-hydroxy-3-oxopropionate reductase, 4-hydroxybutyrate dehydrogenase, estradiol 17β-dehydrogenase, testosterone 17β-dehydrogenase, testosterone 17β-dehydrogenase ($NADP^+$), pyridoxine 4-dehydrogenase, w-hydroxydecanoate dehydrogenase, mannitol 2-dehydrogenase, gluconate 5-dehydrogenase, alcohol dehydrogenase $[NAD(P)^+]$, glycerol dehydrogenase ($NADP^+$), octanol dehydrogenase, (R)-aminopropanal dehydrogenase, (S,S)-butanediol dehydrogenase, lactaldehyde reductase, methylglyoxal reductase (NADH-dependent), glyoxylate reductase ($NADP^+$), isopropanol dehydrogenase ($NADP^+$), hydroxypyruvate reductase, malate dehydrogenase ($NADP^+$), D-malate dehydrogenase (decarboxylating), dimethylmalate dehydrogenase, 3-isopropylmalate dehydrogenase, ketol-acid reductoisomerase, homoisocitrate dehydrogenase, hydroxymethylglutaryl-CoA reductase, aryl-alcohol dehydrogenase, aryl-alcohol dehydrogenase ($NADP^+$), oxaloglycolate reductase (decarboxylating), tartrate dehydrogenase, glycerol-3-phosphate dehydrogenase $[NAD(P)^+]$, phosphoglycerate dehydrogenase, diiodophenylpyruvate reductase, 3-hydroxybenzyl-alcohol dehydrogenase, (R)-2-hydroxy-fatty-acid dehydrogenase, (S)-2-hydroxy-fatty-acid dehydrogenase, 3-oxoacyl-[acyl-carrier-protein] reductase, acylglycerone-phosphate reductase, 3-dehydrosphinganine reductase, L-threonine 3-dehydrogenase, 4-oxoproline reductase, all-trans-retinol dehydrogenase ($NAD^+$), pantoate 4-dehydrogenase, pyridoxal 4-dehydrogenase, carnitine 3-dehydrogenase, indolelactate dehydrogenase, 3-(imidazol-5-yl)lactate dehydrogenase, indanol dehydrogenase, L-xylose 1-dehydrogenase, apiose 1-reductase, ribose 1-dehydrogenase ($NADP^+$), D-arabinose 1-dehydrogenase, D-arabinose 1-dehydrogenase $[NAD(P)^+]$, glucose 1-dehydrogenase ($NAD^+$), glucose 1-dehydrogenase ($NADP^+$), galactose 1-dehydrogenase ($NADP^+$), aldose 1-dehydrogenase, D-threo-aldose 1-dehydrogenase, sorbose 5-dehydrogenase ($NADP^+$), fructose 5-dehydrogenase ($NADP^+$), 2-deoxy-D-gluconate 3-dehydrogenase, 2-dehydro-3-deoxy-D-gluconate 6-dehydrogenase, 2-dehydro-3-deoxy-D-gluconate 5-dehydrogenase, L-idonate 2-dehydrogenase, L-threonate 3-dehydrogenase, 3-dehydro-L-gulonate 2-dehydrogenase, mannuronate reductase, GDP-mannose 6-dehydrogenase, dTDP-4-dehydrorhamnose reductase, dTDP-6-deoxy-L-talose 4-dehydrogenase, GDP-6-deoxy-D-talose 4-dehydrogenase, UDP-N-acetylglucosamine 6-dehydrogenase, ribitol-5-phosphate 2-dehydrogenase, mannitol 2-dehydrogenase ($NADP^+$), sorbitol-6-phosphate 2-dehydrogenase, 15-hydroxyprostaglandin dehydrogenase ($NAD^+$), D-pinitol dehydrogenase, sequoyitol dehydrogenase, perillyl-alcohol dehydrogenase, 3β-hydroxy-$\Delta^5$-steroid dehydrogenase, 11β-hydroxysteroid dehydrogenase, 16α-hydroxysteroid dehydrogenase, estradiol 17α-dehydrogenase, 20α-hydroxysteroid dehydrogenase, 21-hydroxysteroid dehydrogenase ($NAD^+$), 21-hydroxysteroid dehydrogenase ($NADP^+$), 3α-hydroxy-5β-androstane-17-one 3α-dehydrogenase, sepiapterin reductase, ureidoglycolate dehydrogenase, glycerol 2-dehydrogenase ($NADP^+$), 3-hydroxybutyryl-CoA dehydrogenase, UDP-N-acetylmuramate dehydrogenase, 7α-hydroxysteroid dehydrogenase, dihydrobunolol dehydrogenase, cholestanetetraol 26-dehydrogenase, erythrulose reductase, cyclopentanol dehydrogenase, hexadecanol dehydrogenase, 2-alkyn-1-ol dehydrogenase, hydroxycyclohexanecarboxylate dehydrogenase, hydroxymalonate dehydrogenase, 2-dehydropantolactone reductase (A-specific), 2-dehydropantoate 2-reductase, 3β-hydroxy-4α-methylcholestenecarboxylate 3-dehydrogenase (decarboxylating), 2-oxoadipate reductase, L-rhamnose 1-dehydrogenase, cyclohexane-1,2-diol dehydrogenase, D-xylose 1-dehydrogenase, 12α-hydroxysteroid dehydrogenase, glycerol-3-phosphate 1-dehydrogenase ($NADP^+$), 3-hydroxy-2-methylbutyryl-CoA dehydrogenase, D-xylose 1-dehydrogenase ($NADP^+$), cholest-5-ene-3β,7α-diol 3β-dehydrogenase, geraniol dehydrogenase, carbonyl reductase (NADPH), L-glycol dehydrogenase, dTDP-galactose 6-dehydrogenase, GDP-4-dehydro-D-rhamnose reductase, prostaglandin-F synthase, prostaglandin-$E_2$ 9-reductase, indole-3-acetaldehyde reductase (NADH), indole-3-acetaldehyde reductase (NADPH), long-chain-alcohol dehydrogenase, 5-amino-6-(5-phosphoribosylamino)uracil reductase, coniferyl-alcohol dehydrogenase, cinnamyl-alcohol dehydrogenase, 15-hydroxyprostaglandin-D dehydrogenase ($NADP^+$), 15-hydroxyprostaglandin dehydrogenase ($NADP^+$), (+)-borneol dehydrogenase, (S)-usnate reductase, aldose-6-phosphate reductase (NADPH), 7β-hydroxysteroid dehydrogenase ($NADP^+$), 1,3-propanediol dehydrogenase, uronate dehydrogenase, IMP dehydrogenase, tropinone reductase I, (−)-menthol dehydrogenase, (+)-neomenthol dehydrogenase, 3 (or 17)α-hydroxysteroid dehydrogenase, 3β(or 20α)-hydroxysteroid dehydrogenase, long-chain-3-hydroxyacyl-CoA dehydrogenase, 3-oxoacyl-[acyl-carrier-protein] reductase (NADH), 3α-hydroxysteroid dehydrogenase (A-specific), 2-dehydropantolactone reductase (B-specific), gluconate 2-dehydrogenase, farnesol dehydrogenase, benzyl-2-methyl-hydroxybutyrate dehydrogenase, morphine 6-dehydrogenase, dihydrokaempferol 4-reductase, 6-pyruvoyltetrahydropterin 2'-reductase, vomifoliol 4'-dehydrogenase, (R)-4-hydroxyphenyllactate dehydrogenase, isopiperitenol dehydrogenase, mannose-6-phosphate 6-reductase, chlordecone reductase, 4-hydroxycyclohexanecarboxylate dehydrogenase, (−)-borneol dehydrogenase, (+)-sabinol dehydrogenase, diethyl 2-methyl-3-oxosuccinate reductase, 3α-hydroxyglycyrrhetinate dehydrogenase, 15-hydroxyprostaglandin-I dehydrogenase ($NADP^+$), 15-hydroxyicosatetraenoate dehydrogenase, N-acylmannosamine 1-dehydrogenase, flavanone 4-reductase, 8-oxocoformycin reductase, tropinone reductase II, hydroxyphenylpyruvate reductase, 12β-hydroxysteroid dehydrogenase, 3α(17β-hydroxysteroid dehydrogenase ($NAD^+$), N-acetylhexosamine 1-dehydrogenase, 6-endo-hydroxycineole dehydrogenase, carveol dehydrogenase, methanol dehydrogenase, cyclohexanol dehydrogenase, pterocarpin synthase, codeinone reductase (NADPH), salutaridine reductase (NADPH), D-arabinitol 2-dehydrogenase, galactitol-1-phosphate 5-dehydrogenase, tetrahydroxynaphthalene reductase, (S)-carnitine 3-dehydrogenase, mannitol dehydrogenase, fluoren-9-ol dehydrogenase, 4-(hydroxymethyl)benzenesulfonate dehydrogenase, 6-hydroxyhexanoate dehydrogenase, 3-hydroxypimeloyl-CoA dehydrogenase, sulcatone reductase, sn-glycerol-1-phosphate dehydrogenase, 4-hydroxythreonine-4-phosphate dehydrogenase, 1,5-anhydro-D-fructose reductase, L-idonate 5-dehydrogenase, 3-methylbutanal reductase, dTDP-4-dehydro-6-deoxyglucose reductase, 1-deoxy-D-xylulose-5-phosphate reductoisomerase, 2-(R)-hydroxypropyl-CoM dehydrogenase, 2-(S)-hydroxypropyl-CoM dehydrogenase, 3-keto-steroid reductase, GDP-L-fucose synthase, (R)-2-hydroxyacid dehydrogenase, vellosimine dehydrogenase, 2,5-didehydrogluconate reductase, (+)-trans-carveol dehydrogenase, serine 3-dehydrogenase, 3β-hydroxy-5β-steroid dehydrogenase, 3β-hydroxy-5α-steroid dehydrogenase, (R)-3-hydroxyacid ester dehydrogenase, (S)-3-hydroxyacid ester dehydrogenase, GDP-4-dehydro-6-deoxy-D-mannose reductase, quinate/shikimate dehydrogenase, methylglyoxal reductase (NADPH-dependent), S-(hydroxymethyl)glutathione dehydrogenase, 3"-deamino-3"-oxonicotianamine reductase, isocitrate—homoisocitrate dehydrogenase, D-arabinitol dehydrogenase ($NADP^+$), xanthoxin dehydrogenase, sorbose reductase, 4-phosphoerythronate dehydrogenase, 2-hydroxymethylglutarate dehydrogenase, 1,5-anhydro-D-fructose reductase (1,5-anhydro-D-mannitol-forming), chlorophyll(ide) b reductase, momilactone-A synthase, dihydrocarveol dehydrogenase, limonene-1,2-diol dehydrogenase, 3-hydroxypropionate dehydrogenase ($NADP^+$), malate dehydrogenase [$NAD(P)^+$], NADP-retinol dehydrogenase, D-arabitol-phosphate dehydrogenase, 2,5-diamino-6-(ribosylamino)-4(3H)-pyrimidinone 5'-phosphate reductase, diacetyl reductase [(R)-acetoin forming], diacetyl reductase [(S)-acetoin forming], UDP-glucuronic acid dehydrogenase (UDP-4-keto-hexauronic acid decarboxylating), S-(hydroxymethyl)mycothiol dehydrogenase, D-xylose reductase, phosphonoacetaldehyde reductase (NADH), sulfopropanediol 3-dehydrogenase, (S)-sulfolactate dehydrogenase, (S)-1-phenylethanol dehydrogenase, 2-hydroxy-4-carboxymuconate semialdehyde hemiacetal dehydrogenase, sulfoacetaldehyde reductase, germacrene A alcohol dehydrogenase, and 1'-cis-retinol dehydrogenase); or with a cytochrome as acceptor (including mannitol dehydrogenase (cytochrome), L-lactate dehydrogenase (cytochrome), D-lactate dehydrogenase (cytochrome), D-lactate dehydrogenase (cytochrome c-553), polyvinyl alcohol dehydrogenase (cytochrome), methanol dehydrogenase (cytochrome c), and alcohol dehydrogenase (cytochrome c)); or with oxygen as acceptor (including malate oxidase, glucose oxidase, hexose oxidase, cholesterol oxidase, aryl-alcohol oxidase, L-gulonolactone oxidase, galactose oxidase, pyranose oxidase, L-sorbose oxidase, pyridoxine 4-oxidase, alcohol oxidase, catechol oxidase (dimerizing), (S)-2-hydroxy-acid oxidase, ecdysone oxidase, choline oxidase, secondary-alcohol oxidase, 4-hydroxymandelate oxidase, long-chain-alcohol oxidase, glycerol-3-phosphate oxidase, thiamin oxidase, hydroxyphytanate oxidase, nucleoside oxidase, N-acylhexosamine oxidase, polyvinyl-alcohol oxidase, D-arabinono-1,4-lactone oxidase, vanillyl-alcohol oxidase, nucleoside oxidase ($H_2O_2$-forming), and D-mannitol oxidase, alditol oxidase); or with a disulfide as acceptor (including vitamin-K-epoxide reductase (warfarin-sensitive) or vitamin-K-epoxide reductase (warfarin-insensitive)); or with a quinone or similar compound as acceptor (including quinoprotein glucose dehydrogenase, glycerol-3-phosphate dehydrogenase, malate dehydrogenase (quinone), alcohol dehydrogenase (quinone), formate dehydrogenase-N, cyclic alcohol dehydrogenase (quinone), and quinate dehydrogenase (quinine)); or with other, known, acceptors (including alcohol dehydrogenase (azurin) and glucose-6-phosphate dehydrogenase (coenzyme-$F_{420}$)); or with other acceptors (including choline dehydrogenase, 2-hydroxyglutarate dehydrogenase, gluconate 2-dehydrogenase (acceptor), dehydrogluconate dehydrogenase, D-2-hydroxy-acid dehydrogenase, lactate—malate transhydrogenase, pyridoxine 5-dehydrogenase, glucose dehydrogenase (acceptor), fructose 5-dehydrogenase, sorbose dehydrogenase, glucoside 3-dehydrogenase, glycolate dehydrogenase, cellobiose dehydrogenase (acceptor), alkan-1-ol dehydrogenase (acceptor), D-sorbitol dehydrogenase (acceptor), glycerol dehydrogenase (acceptor), hydroxyacid-oxoacid transhydrogenase, 3-hydroxycyclohexanone dehydrogenase, (R)-pantolactone dehydrogenase (flavin), glucose-fructose oxidoreductase, pyranose dehydrogenase (acceptor), 2-oxoacid reductase, (S)-mandelate dehydrogenase, L-sorbose 1-dehydrogenase, formate dehydrogenase (acceptor), soluble quinoprotein glucose dehydrogenase, NDMA-dependent alcohol dehydrogenase, and NDMA-dependent methanol dehydrogenase).

The oxidoreductases which act on the aldehyde or oxo group of donors can include, but are not limited to, those with NAD+ or NADP+ as acceptor (including formate dehydrogenase, aldehyde dehydrogenase ($NAD^+$), aldehyde dehydrogenase ($NADP^+$), aldehyde dehydrogenase [NAD $(P)^+$], benzaldehyde dehydrogenase ($NADP^+$), betaine-aldehyde dehydrogenase, glyceraldehyde-3-phosphate dehydrogenase ($NADP^+$), acetaldehyde dehydrogenase (acetylating), aspartate-semialdehyde dehydrogenase, glyceraldehyde-3-phosphate dehydrogenase (phosphorylating), glyceraldehyde-3-phosphate dehydrogenase ($NADP^+$) (phosphorylating), malonate-semialdehyde dehydrogenase, succinate-semialdehyde dehydrogenase [$NAD(P)^+$], glyoxylate dehydrogenase (acylating), malonate-semialdehyde dehydrogenase (acetylating), aminobutyraldehyde dehydrogenase, glutarate-semialdehyde dehydrogenase, glycolaldehyde dehydrogenase, lactaldehyde dehydrogenase, 2-oxoaldehyde dehydrogenase ($NAD^+$), succinate-semialdehyde dehydrogenase ($NAD^+$), 2-oxoisovalerate dehydrogenase (acylating), 2,5-dioxovalerate dehydrogenase, methylmalonate-semialdehyde dehydrogenase (acylating), benzaldehyde dehydrogenase ($NAD^+$), aryl-aldehyde dehydrogenase, aryl-aldehyde dehydrogenase ($NADP^+$), L-aminoadipate-semialdehyde dehydrogenase, aminomuconate-semialdehyde dehydrogenase, (R)-dehydropantoate dehydrogenase, retinal dehydrogenase, N-acetyl-γ-glutamyl-phosphate reductase, phenylacetaldehyde dehydrogenase, 3α,7α,12α-trihydroxycholestan-26-al 26-oxidoreductase, glutamate-5-semialdehyde dehydrogenase, hexadecanal dehydrogenase (acylating), formate dehydrogenase ($NADP^+$), cinnamoyl-CoA reductase, formaldehyde dehydrogenase, 4-trimethylammoniobutyraldehyde dehydrogenase, long-chain-aldehyde dehydrogenase, 2-oxoaldehyde dehydrogenase ($NADP^+$), long-chain-fatty-acyl-CoA reductase, pyruvate dehydrogenase ($NADP^+$), oxoglutarate dehydrogenase ($NADP^+$), 4-hydroxyphenylacetaldehyde dehydrogenase, γ-guanidinobutyraldehyde dehydrogenase, butanal dehydrogenase, phenylglyoxylate dehydrogenase (acylating), glyceraldehyde-3-phosphate dehydrogenase ($NAD(P)^+$) (phosphorylating), 5-carboxymethyl-2-hydroxymuconic-semialdehyde dehydrogenase, 4-hydroxymuconic semialdehyde dehydrogenase, 4-formylbenzenesulfonate dehydrogenase, 6-oxohexanoate dehydrogenase, 4-hydroxybenzaldehyde dehydrogenase, salicylaldehyde dehydrogenase, vanillin dehydrogenase, coniferyl-aldehyde dehydrogenase, fluoroacetaldehyde dehydrogenase, glutamyl-tRNA reductase, succinylglutamate-semialdehyde dehydrogenase, erythrose-4-phosphate dehydrogenase, sulfoacetaldehyde dehydrogenase, abietadienal dehydrogenase, malonyl CoA reductase (malonate semialdehyde-forming), succinate-semialdehyde dehydrogenase (acetylating), 3,4-dehydroadipyl-CoA semialdehyde dehydrogenase ($NADP^+$), 2-formylbenzoate dehydrogenase, succinate-semialdehyde dehydrogenase ($NADP^+$), long-chain acyl-[acyl-carrier-protein] reductase, sulfoacetaldehyde dehydrogenase (acylating), and β-apo-4'-carotenal oxygenase); or with a cytochrome as acceptor (including formate dehydrogenase (cytochrome), formate dehydrogenase (cytochrome-c-553), and carbon-monoxide dehydrogenase (cytochrome-b-561)); or with oxygen as acceptor (including aldehyde oxidase, pyruvate oxidase, oxalate oxidase, glyoxylate oxidase, pyruvate oxidase (CoA-acetylating), indole-3-acetaldehyde oxidase, pyridoxal oxidase, aryl-aldehyde oxidase, retinal oxidase, 4-hydroxyphenylpyruvate oxidase, and abscisic aldehyde oxidase); or with a disulfide as acceptor (including pyruvate dehydrogenase (acetyl-transferring), oxoglutarate dehydrogenase (succinyl-transferring), and 3-methyl-2-oxobutanoate dehydrogenase (2-methylpropanoyl-transferring)); or with a quinone or similar compound as acceptor (including pyruvate dehydrogenase (quinone)); or with an iron-sulfur protein as acceptor (including pyruvate synthase, 2-oxobutyrate synthase, 2-oxoglutarate synthase, carbon-monoxide dehydrogenase (ferredoxin), aldehyde ferredoxin oxidoreductase, glyceraldehyde-3-phosphate dehydrogenase (ferredoxin), 3-methyl-2-oxobutanoate dehydrogenase (ferredoxin), indolepyruvate ferredoxin oxidoreductase, and oxalate oxidoreductase); or with other acceptors (including carbon-monoxide dehydrogenase (acceptor), aldehyde dehydrogenase (pyrroloquinoline-quinone), formaldehyde dismutase, formylmethanofuran dehydrogenase, carboxylate reductase, and aldehyde dehydrogenase (FAD-independent)).

The oxidoreductases which act on the CH—CH group of donors can include, but are not limited to, those with NAD+ or NADP+ as acceptor (e.g., dihydropyrimidine dehydrogenase ($NAD^+$), dihydropyrimidine dehydrogenase ($NADP^+$), $\Delta^4$-3-oxosteroid 5β-reductase, cortisone α-reductase, cucurbitacin $\Delta^{23}$-reductase, fumarate reductase (NADH), meso-tartrate dehydrogenase, acyl-CoA dehydrogenase ($NADP^+$), enoyl-[acyl-carrier-protein] reductase (NADH), enoyl-[acyl-carrier-protein] reductase (NADPH, B-specific), 2-coumarate reductase, prephenate dehydrogenase, prephenate dehydrogenase ($NADP^+$), dihydroorotate dehydrogenase ($NAD^+$), dihydroorotate dehydrogenase ($NADP^+$), β-nitroacrylate reductase, 3-methyleneoxindole reductase, kynurenate-7,8-dihydrodiol dehydrogenase, cis-1,2-dihydrobenzene-1,2-diol dehydrogenase, trans-1,2-dihydrobenzene-1,2-diol dehydrogenase, 7-dehydrocholesterol reductase, cholestenone 5α-reductase, biliverdin reductase, 1,6-dihydroxycyclohexa-2,4-diene-1-carboxylate dehydrogenase, dihydrodipicolinate reductase, 2-hexadecenal reductase, 2,3-dihydro-2,3-dihydroxybenzoate dehydrogenase, cis-1,2-dihydro-1,2-dihydroxynaphthalene dehydrogenase, progesterone 5α-reductase, 2-enoate reductase, maleylacetate reductase, protochlorophyllide reductase, 2,4-dienoyl-CoA reductase (NADPH), phosphatidylcholine desaturase, geissoschizine dehydrogenase, cis-2-enoyl-CoA reductase (NADPH), trans-2-enoyl-CoA reductase (NADPH), enoyl-[acyl-carrier-protein] reductase (NADPH, A-specific), 2-hydroxy-6-oxo-6-phenylhexa-2,4-dienoate reductase, xanthommatin reductase, 12-oxophytodienoate reductase, arogenate dehydrogenase, trans-2-enoyl-CoA reductase ($NAD^+$), 2'-hydroxyisoflavone reductase, biochanin-A reductase, α-santonin 1,2-reductase, 15-oxoprostaglandin 13-oxidase, cis-3,4-dihydrophenanthrene-3,4-diol dehydrogenase, 2'-hydroxydaidzein reductase, 2-methyl-branched-chain-enoyl-CoA reductase, (3S,4R)-3,4-dihydroxycyclohexa-1,5-diene-1,4-dicarboxylate dehydrogenase, precorrin-6A reductase, cis-2,3-dihydrobiphenyl-2,3-diol dehydrogenase, phloroglucinol reductase, 2,3-dihydroxy-2,3-dihydro-p-cumate dehydrogenase, dibenzothiophene dihydrodiol dehydrogenase, terephthalate 1,2-cis-dihydrodiol dehydrogenase, pimeloyl-CoA dehydrogenase, 2,4-dichlorobenzoyl-CoA reductase, phthalate 4,5-cis-dihydrodiol dehydrogenase, 5,6-dihydroxy-3-methyl-2-oxo-1,2,5,6-tetrahydroquinoline dehydrogenase, cis-dihydroethylcatechol dehydrogenase, cis-1,2-dihydroxy-4-methylcyclohexa-3,5-diene-1-carboxylate dehydrogenase, 1,2-dihydroxy-6-methylcyclohexa-3,5-dienecarboxylate dehydrogenase, zeatin reductase, $\Delta^{14}$-sterol reductase, $\Delta^{24}$ (241)-sterol reductase, $\Delta^{24}$-sterol reductase, 1,2-dihydrovomilenine reductase, 2-alkenal reductase, divinyl chlorophyllide a 8-vinyl-reductase, precorrin-2 dehydrogenase, anthocyanidin reductase, arogenate dehydrogenase ($NADP^+$), arogenate dehydrogenase [$NAD(P)^+$], red chlorophyll catabolite reductase, (+)-pulegone reductase, (−)-isopiperitenone reductase, geranylgeranyl diphosphate reductase acrylyl-CoA reductase (NADPH), crotonyl-CoA carboxylase/reductase, crotonyl-CoA reductase, 3-(cis-5,6-dihydroxycyclohexa-1,3-dien-1-yl)propanoate dehydrogenase, tRNA-dihydrouridine$^{16/17}$ synthase [$NAD(P)^+$], tRNA-dihydrouridine$^{47}$ synthase [$NAD(P)^+$], tRNA-dihydrouridine$^{20/20b}$ synthase [$NAD(P)^+$], and tRNA-dihydrouridine$^{20}$ synthase [$NAD(P)^+$]) or with a cytochrome as acceptor, e.g. L-galactonolactone dehydrogenase, or with oxygen as acceptor (e.g., coproporphyrinogen oxidase, protoporphyrinogen oxidase, bilirubin oxidase, acyl-CoA oxidase, dihydrouracil oxidase, tetrahydroberberine oxidase, secologanin synthase, tryptophan αβ-oxidase, pyrroloquinoline-quinone synthase, and L-galactonolactone oxidase), or with a quinine or related compound as acceptor (e.g., succinate dehydrogenase (ubiquinone), dihydroorotate dehydrogenase (quinone), protoporphyrinogen IX dehydrogenase (menaquinone), fumarate reductase (menaquinone), 15-cis-phytoene desaturase, and 9,9'-dicis-ζ-carotene desaturase), or with an iron-sulfur protein as acceptor (e.g., 6-hydroxynicotinate reductase, 15,16-dihydrobiliverdin:ferredoxin oxidoreductase, phycoerythrobilin:ferredoxin oxidoreductase, phytochromobilin:ferredoxin oxidoreductase, phycocyanobilin:ferredoxin oxidoreductase, phycoerythrobilin synthase, ferredoxin:protochlorophyllide reductase (ATP-dependent), benzoyl-CoA reductase, and 4-hydroxybenzoyl-CoA reductase) or with flavin as acceptor (e.g., butyryl-CoA dehydrogenase or 4,4'-diapophytoene desaturase), or with other, known acceptors (e.g., dihydroorotate dehydrogenase (fumarate)), or with other acceptors (e.g., succinate dehydrogenase, acyl-CoA dehydrogenase, 3-oxosteroid 1-dehydrogenase, 3-oxo-5α-steroid 4-dehydrogenase, 3-oxo-5β-steroid 4-dehydrogenase, glutaryl-CoA dehydrogenase, 2-furoyl-CoA dehydrogenase, isovaleryl-CoA dehydrogenase, 2-methylacyl-CoA dehydrogenase, long-chain-acyl-CoA dehydrogenase, cyclohexanone dehydrogenase, isoquinoline 1-oxidoreductase, quinoline 2-oxidoreductase, quinaldate 4-oxidoreductase, quinoline-4-carboxylate 2-oxidoreductase, (R)-benzylsuccinyl-CoA dehydrogenase, coproporphyrinogen dehydrogenase, all-trans-retinol 13,14-reductase, 2-amino-4-deoxychorismate dehydrogenase, carvone reductase, all-trans-ζ-carotene desaturase, 1-hydroxycarotenoid 3,4-desaturase, phytoene desaturase (neurosporene-forming), phytoene desaturase (ζ-carotene-forming), phytoene desaturase (3,4-didehydrolycopene-forming), and phytoene desaturase (lycopene-forming)).

The oxidoreductases which act on the CH—NH2 group of donors can include, but are not limited to, those with $NAD^+$ or $NADP^+$ as acceptor (e.g., alanine dehydrogenase, glutamate dehydrogenase, glutamate dehydrogenase [$NAD(P)^+$], glutamate dehydrogenase ($NADP^+$), L-amino-acid dehydrogenase, serine 2-dehydrogenase, valine dehydrogenase ($NADP^+$), leucine dehydrogenase, glycine dehydrogenase, L-erythro-3,5-diaminohexanoate dehydrogenase, 2,4-diaminopentanoate dehydrogenase, glutamate synthase (NADPH), glutamate synthase (NADH), lysine dehydrogenase, diaminopimelate dehydrogenase, N-methylalanine dehydrogenase, lysine 6-dehydrogenase, tryptophan dehydrogenase, phenylalanine dehydrogenase, and aspartate dehydrogenase), or with a chyochrome as acceptor (e.g. glycine dehydrogenase (cytochrome)), or with oxygen as acceptor (e.g. D-aspartate oxidase, L-amino-acid oxidase, D-amino-acid oxidase, amine oxidase, pyridoxal 5'-phosphate synthase, D-glutamate oxidase, ethanolamine oxidase, putrescine oxidase, L-glutamate oxidase, cyclohexylamine oxidase, protein-lysine 6-oxidase, L-lysine oxidase, D-glutamate(D-aspartate) oxidase, L-aspartate oxidase, glycine oxidase, L-lysine 6-oxidase, primary-amine oxidase, diamine oxidase, and 7-chloro-L-tryptophan oxidase), or with a disulfide as acceptor (e.g. glycine dehydrogenase (decarboxylating)), or with a quinine or similar compound as acceptor (e.g. D-amino acid dehydrogenase (quinone)) or with an iron-sulfur protein as acceptor (e.g. glutamate synthase (ferredoxin)), or with a copper protein as acceptor (e.g. methylamine dehydrogenase (amicyanin) and aralkylamine dehydrogenase (azurin)), and with other acceptors (e.g D-amino-acid dehydrogenase, taurine dehydrogenase, and glycine dehydrogenase (cyanide-forming)).

The oxidoreductases which act on the CH—NH group of donors can include, but are not limited to, those with $NAD^+$ or $NADP^+$ as acceptor (e.g., pyrroline-2-carboxylate reductase, pyrroline-5-carboxylate reductase, dihydrofolate reductase, methylenetetrahydrofolate dehydrogenase ($NADP^+$), formyltetrahydrofolate dehydrogenase, saccharopine dehydrogenase ($NAD^+$, L-lysine-forming), saccharopine dehydrogenase ($NADP^+$, L-lysine-forming), saccharopine dehydrogenase ($NAD^+$, L-glutamate-forming), saccharopine dehydrogenase ($NADP^+$, L-glutamate-forming), D-octopine dehydrogenase, 1-pyrroline-5-carboxylate dehydrogenase, methylenetetrahydrofolate dehydrogenase ($NAD^+$), D-lysopine dehydrogenase, alanopine dehydrogenase, ephedrine dehydrogenase, D-nopaline dehydrogenase, methylenetetrahydrofolate reductase [NAD(P)H], $\Delta^1$-piperideine-2-carboxylate reductase, strombine dehydrogenase, tauropine dehydrogenase, $N^5$-(carboxyethyl)ornithine synthase, thiomorpholine-carboxylate dehydrogenase, β-alanopine dehydrogenase, 1,2-dehydroreticulinium reductase (NADPH), opine dehydrogenase, flavin reductase (NADPH), berberine reductase, vomilenine reductase, pteridine reductase, 6,7-dihydropteridine reductase, flavin reductase (NADH), FAD reductase (NADH), FMN reductase (NADPH), FMN reductase [NAD(P)H], 8-hydroxy-5-deazaflavin:NADPH oxidoreductase, riboflavin reductase [NAD(P)H], and FMN reductase (NADH)), with oxygen as acceptor (e.g., sarcosine oxidase, N-methyl-L-amino-acid oxidase, $N^6$-methyl-lysine oxidase, (S)-6-hydroxynicotine oxidase, (R)-6-hydroxynicotine oxidase, L-pipecolate oxidase, dimethylglycine oxidase, dihydrobenzophenanthridine oxidase, $N^1$-acetylpolyamine oxidase, polyamine oxidase (propane-1,3-diamine-forming), $N^1$-acetylspermidine oxidase (propane-1,3-diamine-forming), spermine oxidase, non-specific polyamine oxidase, and L-saccharopine oxidase), with a disulfide as acceptor (e.g. pyrimidodiazepine synthase), with a quinine or similar compound as acceptor (e.g. electron-transferring-flavoprotein dehydrogenase), with an iron-sulfur protein as acceptor (e.g. methylenetetrahydrofolate reductase (ferredoxin)), with a flavin as acceptor (e.g. dimethylamine dehydrogenase, and trimethylamine dehydrogenase), and with other acceptors (e.g., sarcosine dehydrogenase, dimethylglycine dehydrogenase, L-pipecolate dehydrogenase, nicotine dehydrogenase, methylglutamate dehydrogenase, spermidine dehydrogenase, proline dehydrogenase, methylenetetrahydromethanopterin dehydrogenase, 5,10-methylenetetrahydromethanopterin reductase, cytokinin dehydrogenase, and D-proline dehydrogenase).

The oxidoreductases which act on NADH or NADPH can include, but are not limited to, those with $NAD^+$ or $NADP^+$ as acceptor (e.g., $NAD(P)^+$ transhydrogenase (B-specific), and $NAD(P)^+$ transhydrogenase (AB-specific)), with a heme protein as acceptor (e.g. cytochrome-$b_5$ reductase, NADPH—hemoprotein reductase, NADPH—cytochrome-$c_2$ reductase, and leghemoglobin reductase), with oxygen as acceptor (e.g. NAD(P)H oxidase), with a quinine or similar compound as acceptor (e.g., NAD(P)H dehydrogenase (quinone), NADH:ubiquinone reductase ($H^+$-translocating), monodehydroascorbate reductase (NADH), NADPH:quinone reductase, p-benzoquinone reductase (NADPH), 2-hydroxy-1,4-benzoquinone reductase, NADH:ubiquinone reductase ($Na^+$-transporting), NADH:ubiquinone reductase (non-electrogenic), and NADPH dehydrogenase (quinone)), with a nitrogenous group as acceptor (e.g. trimethylamine-N-oxide reductase), with an iron-sulfur protein as acceptor, with a flavin as acceptor, and with other acceptors (e.g, NADPH dehydrogenase, NADH dehydrogenase, NADH dehydrogenase (quinone)).

The oxidoreductases which act on other nitrogenous compounds as donors can include, but are not limited to, those with $NAD^+$ or $NADP^+$ as acceptor (e.g., nitrate reductase (NADH), nitrate reductase [NAD(P)H], nitrate reductase (NADPH), nitrite reductase [NAD(P)H], hyponitrite reductase, azobenzene reductase, GMP reductase, nitroquinoline-N-oxide reductase, hydroxylamine reductase (NADH), 4-(dimethylamino)phenylazoxybenzene reductase, N-hydroxy-2-acetamidofluorene reductase, $preQ_1$ reductase, and nitric oxide reductase [NAD(P), nitrous oxide-forming]), with a cytochrome as acceptor (e.g. nitrite reductase (NO-forming), nitrite reductase (cytochrome; ammonia-forming), trimethylamine-N-oxide reductase (cytochrome c), nitrous-oxide reductase, and nitric oxide reductase (cytochrome c)), with oxygen as acceptor (e.g., nitroalkane oxidase, acetylindoxyl oxidase, factor-independent urate hydroxylase, hydroxylamine oxidase, and 3-aci-nitropropanoate oxidase), with a quinone or similar compound as acceptor (e.g. nitrate reductase (quinone) and nitric oxide reductase (menaquinol)), with a nitrogenous group as acceptor (e.g. nitrite dismutase), with an iron-sulfur protein as acceptor (e.g, ferredoxin—nitrite reductase and ferredoxin—nitrate reductase), and with other acceptors (e.g., hydroxylamine reductase, nitrate reductase, and hydrazine oxidoreductase).

The oxidoreductases which act on a sulfur group of donors can include, but are not limited to, those with $NAD^+$ or $NADP^+$ as acceptor (e.g., sulfite reductase (NADPH), hypotaurine dehydrogenase, dihydrolipoyl dehydrogenase, 2-oxopropyl-CoM reductase (carboxylating), cystine reductase, glutathione-disulfide reductase, protein-disulfide reductase, thioredoxin-disulfide reductase, CoA-glutathione reductase, asparagusate reductase, trypanothione-disulfide reductase, bis-γ-glutamylcystine reductase, CoA-disulfide reductase, mycothione reductase, glutathione amide reductase, and dimethylsulfone reductase), with a cytochrome as acceptor (e.g., sulfite dehydrogenase, thiosulfate dehydrogenase sulfide-cytochrome-c reductase (flavocytochrome c), and dimethyl sulfide:cytochrome $c_2$ reductase), with oxygen as acceptor (e.g. sulfite oxidase, thiol oxidase, glutathione oxidase, methanethiol oxidase, prenylcysteine oxidase, and farnesylcysteine lyase), with a disulfide as acceptor (e.g., glutathione—homocystine transhydrogenase, protein-disulfide reductase (glutathione), glutathione—CoA-glutathione transhydrogenase, glutathione—cystine transhydrogenase, enzyme-thiol transhydrogenase (glutathione-disulfide), phosphoadenylyl-sulfate reductase (thioredoxin), adenylyl-sulfate reductase (glutathione), adenylyl-sulfate reductase (thioredoxin), peptide-methionine (S)—S-oxide reductase, peptide-methionine (R)—S-oxide reductase, L-methionine (S)—S-oxide reductase, and L-methionine (R)—S-oxide reductase), with a quinine or similar compound as acceptor (e.g., glutathione dehydrogenase (ascorbate), thiosulfate dehydrogenase (quinone), dimethylsulfoxide reductase, and sulfide:quinone reductase), with a nitrogenous group as acceptor, with an iron-sulfur protein as acceptor (e.g. sulfite reductase (ferredoxin) and ferredoxin:thioredoxin reductase), with other, known acceptors (e.g. CoB—CoM heterodisulfide reductase and sulfuredoxin), and with other acceptors (e.g. sulfite reductase, adenylyl-sulfate reductase, and hydrogen sulfite reductase).

The oxidoreductases which act on a heme group of donors can include, but are not limited to, those with oxygen as acceptor (e.g., cytochrome-c oxidase), with a nitrogenous group as acceptor (e.g. nitrate reductase (cytochrome)), and with other acceptors (e.g. iron—cytochrome-c reductase).

The oxidoreductases which act on diphenols and related substances as donors can include, but are not limited to, those with $NAD^+$ or $NADP^+$ as acceptor (e.g. trans-acenaphthene-1,2-diol dehydrogenase), with a cytochrome as acceptor (e.g. L-ascorbate—cytochrome-$b_5$ reductase and ubiquinol—cytochrome-c reductase), with oxygen as acceptor (e.g, catechol oxidase, laccase, L-ascorbate oxidase, o-aminophenol oxidase, 3-hydroxyanthranilate oxidase, rifamycin-B oxidase, photosystem II, ubiquinol oxidase ($H^+$-transporting), ubiquinol oxidase, and menaquinol oxidase ($H^+$-transporting)), and with other acceptors (e.g., plastoquinol—plastocyanin reductase, ribosyldihydronicotinamide dehydrogenase (quinone), and violaxanthin de-epoxidase).

The oxidoreductases which act on peroxide as acceptor can include, but are not limited to, peroxidases (e.g., NADH peroxidase, NADPH peroxidase, fatty-acid peroxidase, cytochrome-c peroxidase, catalase, peroxidase, iodide peroxidase, glutathione peroxidase, chloride peroxidase, L-ascorbate peroxidase, phospholipid-hydroperoxide glutathione peroxidase, manganese peroxidase, lignin peroxidase, peroxiredoxin, versatile peroxidase, glutathione amide-dependent peroxidase, bromide peroxidase, dye decolorizing peroxidase, prostamide/prostaglandin $F_{2\alpha}$ synthase, catalase-peroxidase) and those with $H_2O_2$ as acceptor, one oxygen atom of which is incorporated into the product (e.g. unspecific peroxygenase, myeloperoxidase, plant seed peroxygenase, and fatty-acid peroxygenase).

The oxidoreductases which act on hydrogen as donor can include, but are not limited to, those with $NAD^+$ or $NADP^+$ as acceptor (e.g., hydrogen dehydrogenase, hydrogen dehydrogenase ($NADP^+$), and hydrogenase ($NAD^+$, ferredoxin)), with a cytochrome as acceptor (e.g. cytochrome-$c_3$ hydrogenase), with a quinine or similar compound as acceptor (e.g., hydrogen:quinone oxidoreductase), with an iron-sulfur protein as acceptor (e.g. ferredoxin hydrogenase), with other known acceptors (e.g., coenzyme $F_{420}$ hydrogenase, 5,10-methenyltetrahydromethanopterin hydrogenase, and *Methanosarcina*-phenazine hydrogenase), and with other acceptors (e.g. hydrogenase (acceptor)).

The oxidoreductases which act on single donors with incorporation of molecular oxygen (oxygenases) can include, but are not limited to, those with incorporation of two atoms of oxygen (e.g., catechol 1,2-dioxygenase, catechol 2,3-dioxygenase, protocatechuate 3,4-dioxygenase, gentisate 1,2-dioxygenase, homogentisate 1,2-dioxygenase, 3-hydroxyanthranilate 3,4-dioxygenase, protocatechuate 4,5-dioxygenase, 2,5-dihydroxypyridine 5,6-dioxygenase, 7,8-dihydroxykynurenate 8,8a-dioxygenase, tryptophan 2,3-dioxygenase, linoleate 13S-lipoxygenase, ascorbate 2,3-dioxygenase, 2,3-dihydroxybenzoate 3,4-dioxygenase, 3,4-dihydroxyphenylacetate 2,3-dioxygenase, 3-carboxyethylcatechol 2,3-dioxygenase, indole 2,3-dioxygenase, sulfur dioxygenase, cysteamine dioxygenase, cysteine dioxygenase, caffeate 3,4-dioxygenase, 2,3-dihydroxyindole 2,3-dioxygenase, quercetin 2,3-dioxygenase, 3,4-dihydroxy-9,10-secoandrosta-1,3,5(10)-triene-9,17-dione 4,5-dioxygenase, peptide-tryptophan 2,3-dioxygenase, 4-hydroxyphenylpyruvate dioxygenase, 2,3-dihydroxybenzoate 2,3-dioxygenase, stizolobate synthase, stizolobinate synthase, arachidonate 12-lipoxygenase, arachidonate 15-lipoxygenase, arachidonate 5-lipoxygenase, pyrogallol 1,2-oxygenase, chloridazon-catechol dioxygenase, hydroxyquinol 1,2-dioxygenase, 1-hydroxy-2-naphthoate 1,2-dioxygenase, biphenyl-2,3-diol 1,2-dioxygenase, arachidonate 8-lipoxygenase, 2,4'-dihydroxyacetophenone dioxygenase, lignostilbene αβ-dioxygenase, linoleate diol synthase, linoleate 11-lipoxygenase, 4-hydroxymandelate synthase, 3-hydroxy-4-oxoquinoline 2,4-dioxygenase, 3-hydroxy-2-methyl-quinolin-4-one 2,4-dioxygenase, chlorite $O_2$-lyase, acetylacetone-cleaving enzyme, 9-cis-epoxycarotenoid dioxygenase, indoleamine 2,3-dioxygenase, acireductone dioxygenase ($Ni^{2+}$-requiring), acireductone dioxygenase [iron(II)-requiring], sulfur oxygenase/reductase, 1,2-dihydroxynaphthalene dioxygenase, gallate dioxygenase, linoleate 9S-lipoxygenase, and torulene dioxygenase), with incorporation of one atom of oxygen (internal monooxygenases or internal mixed function oxidases) (e.g., arginine 2-monooxygenase, lysine 2-monooxygenase, tryptophan 2-monooxygenase, lactate 2-monooxygenase, *Renilla*-luciferin 2-monooxygenase, *Cypridina*-luciferin 2-monooxygenase, *Photinus*-luciferin 4-monooxygenase (ATP-hydrolysing), *Watasenia*-luciferin 2-monooxygenase, phenylalanine 2-monooxygenase, apo-β-carotenoid-14',13'-dioxygenase, *Oplophorus*-luciferin 2-monooxygenase, 3,4-dihydroxyphenylalanine oxidative deaminase, nitronate monooxygenase, dichloroarcyriaflavin A synthase, dinoflagellate luciferase, and 2-oxuglutarate dioxygenase (ethylene-forming)), inositol oxygenase, and tryptophan 2'-dioxygenase.

The oxidoreductases which act on paired donors, with incorporation or reduction of molecular oxygen can include, but are not limited to, those with ascorbate as one donor, with reduced pteridine as one donor, with 2-oxoglutarate as one donor, and incorporation of one atom each of oxygen into both donors (e.g. γ-butyrobetaine dioxygenase, procollagen-proline dioxygenase, pyrimidine-deoxynucleoside 2'-dioxygenase, procollagen-lysine 5-dioxygenase, thymine dioxygenase, procollagen-proline 3-dioxygenase, trimethyllysine dioxygenase, flavanone 3-dioxygenase, pyrimidine-deoxynucleoside 1'-dioxygenase, hyoscyamine (6S)-dioxygenase, gibberellin-44 dioxygenase, gibberellin 2β-dioxygenase, 6β-hydroxyhyoscyamine epoxidase, gibberellin 3β-dioxygenase, peptide-aspartate β-dioxygenase, taurine dioxygenase, phytanoyl-CoA dioxygenase, leucocyanidin oxygenase, deacetoxyvindoline 4-hydroxylase, clavaminate synthase, flavone synthase, flavonol synthase, 2'-deoxymugineic-acid 2'-dioxygenase, mugineic-acid 3-dioxygenase, deacetoxycephalosporin-C hydroxylase, [histone-H3]-lysine-36 demethylase, proline 3-hydroxylase, hypoxia-inducible factor-proline dioxygenase, hypoxia-inducible factor-asparagine dioxygenase, thebaine 6-O-demethylase, codeine 3-O-demethylase, DNA oxidative demethylase, and 2-oxoglutarate/L-arginine monooxygenase/decarboxylase (succinate-forming)), with NADH or NADPH as one donor, and incorporation of two atoms of oxygen into one donor (e.g., anthranilate 1,2-dioxygenase (deaminating, decarboxylating), benzene 1,2-dioxygenase, 3-hydroxy-2-methylpyridinecarboxylate dioxygenase, 5-pyridoxate dioxygenase, phthalate 4,5-dioxygenase, 4-sulfobenzoate 3,4-dioxygenase, 4-chlorophenylacetate 3,4-dioxygenase, benzoate 1,2-dioxygenase, toluene dioxygenase, naphthalene 1,2-dioxygenase, 2-chlorobenzoate 1,2-dioxygenase, 2-aminobenzenesulfonate 2,3-dioxygenase, terephthalate 1,2-dioxygenase, 2-hydroxyquinoline 5,6-dioxygenase, nitric oxide dioxygenase, biphenyl 2,3-dioxygenase, 3-phenylpropionate dioxygenase, pheophorbide a oxygenase, benzoyl-CoA 2,3-dioxygenase, and carbazole 1,9a-dioxygenase), with NADH or NADPH as one donor, and incorporation of one atom of oxygen (e.g., salicylate 1-monooxygenase, 4-hydroxybenzoate 3-monooxygenase, melilotate 3-monooxygenase, imidazoleacetate 4-monooxygenase, orcinol 2-monooxygenase, phenol 2-monooxygenase, flavin-containing monooxygenase, kynurenine 3-monooxygenase, 2,6-dihydroxypyridine 3-monooxygenase, trans-cinnamate 4-monooxygenase, benzoate 4-monooxygenase, calcidiol 1-monooxygenase, trans-cinnamate 2-monooxygenase, cholestanetriol 26-monooxygenase, cyclopentanone monooxygenase, cholesterol 7α-monooxygenase, 4-hydroxyphenylacetate 1-monooxygenase, taxifolin 8-monooxygenase, 2,4-dichlorophenol 6-monooxygenase, flavonoid 3'-monooxygenase, cyclohexanone monooxygenase, 3-hydroxybenzoate 4-monooxygenase, 3-hydroxybenzoate 6-monooxygenase, methane monooxygenase (soluble), phosphatidylcholine 12-monooxygenase, 4-aminobenzoate 1-monooxygenase, 3,9-dihydroxypterocarpan 6α-monooxygenase, 4-nitrophenol 2-monooxygenase, leukotriene-$B_4$ 20-monooxygenase, 2-nitrophenol 2-monooxygenase, albendazole monooxygenase, 4-hydroxybenzoate 3-monooxygenase [NAD(P)H], leukotriene-$E_4$ 20-monooxygenase, anthranilate 3-monooxygenase (deaminating), 5-O-(4-coumaroyl)-D-quinate 3'-monooxygenase, methyltetrahydroprotoberberine 14-monooxygenase, anhydrotetracycline monooxygenase, nitric-oxide synthase, anthraniloyl-CoA monooxygenase, tyrosine N-monooxygenase, questin monooxygenase, 2-hydroxybiphenyl 3-monooxygenase, (−)-menthol monooxygenase, (S)-limonene 3-monooxygenase, (S)-limonene 6-monooxygenase, (S)-limonene 7-monooxygenase, pentachlorophenol monooxygenase, 6-oxocineole dehydrogenase, isoflavone 3'-hydroxylase, 4'-methoxyisoflavone 2'-hydroxylase, ketosteroid monooxygenase, protopine 6-monooxygenase, dihydrosanguinarine 10-monooxygenase, dihydrochelirubine 12-monooxygenase, benzoyl-CoA 3-monooxygenase, L-lysine 6-monooxygenase (NADPH), 27-hydroxycholesterol 7α-monooxygenase, 2-hydroxyquinoline 8-monooxygenase, 4-hydroxyquinoline 3-monooxygenase, 3-hydroxyphenylacetate 6-hydroxylase, 4-hydroxybenzoate 1-hydroxylase, 2-hydroxycyclohexanone 2-monooxygenase, quinine 3-monooxygenase, 4-hydroxyphenylacetaldehyde oxime monooxygenase, alkene monooxygenase, sterol 14-demethylase, N-methylcoclaurine 3'-monooxygenase, methylsterol monooxygenase, tabersonine 16-hydroxylase, 7-deoxyloganin 7-hydroxylase, vinorine hydroxylase, taxane 10β-hydroxylase, taxane 13α-hydroxylase, ent-kaurene oxidase, ent-kaurenoic acid oxidase, (R)-limonene 6-monooxygenase, magnesium-protoporphyrin IX monomethyl ester (oxidative) cyclase, vanillate monooxygenase, precorrin-3B synthase, 4-hydroxyacetophenone monooxygenase, glyceollin synthase, 2-hydroxyisoflavanone synthase, licodione synthase, flavonoid 3',5'-hydroxylase, isoflavone 2'-hydroxylase, zeaxanthin epoxidase, deoxysarpagine hydroxylase, phenylacetone monooxygenase, (+)-abscisic acid 8'-hydroxylase, lithocholate 6β-hydroxylase, 7α-hydroxycholest-4-en-3-one 12α-hydroxylase, 5β-cholestane-3α,7α-diol 12α-hydroxylase, taurochenodeoxycholate 6α-hydroxylase, cholesterol 24-hydroxylase, 24-hydroxycholesterol 7α-hydroxylase, 25-hydroxycholesterol 7α-hydroxylase, senecionine N-oxygenase, psoralen synthase, 8-dimethylallylnaringenin 2'-hydroxylase, (+)-menthofuran synthase, monocyclic monoterpene ketone monooxygenase, epi-isozizaene 5-monooxygenase, limonene 1,2-monooxygenase, abietadiene hydroxylase, abietadienol hydroxylase, geranylgeraniol 18-hydroxylase, methanesulfonate monooxygenase, 3-epi-6-deoxocathasterone 23-monooxygenase, FAD-dependent urate hydroxylase, 6-hydroxynicotinate 3-monooxygenase, angelicin synthase, geranylhydroquinone 3''-hydroxylase, isoleucine N-monooxygenase, valine N-monooxygenase, 5-epiaristolochene 1,3-dihydroxylase, costunolide synthase, premnaspirodiene oxygenase, chlorophyllide-a oxygenase, germacrene A hydroxylase, phenylalanine N-monooxygenase, tryptophan N-monooxygenase, vitamin $D_3$ 24-hydroxylase, 3-(3-hydroxyphenyl)propanoate hydroxylase, 7-methylxanthine demethylase, β-carotene 3-hydroxylase, pyrrole-2-carboxylate monooxygenase, dimethyl-sulfide monooxygenase, and squalene monooxygenase, with reduced flavin or flavoprotein as one donor, and incorporation of one atom of oxygen (e.g., unspecific monooxygenase, alkanal monooxygenase (FMN-linked), alkanesulfonate monooxygenase, tryptophan 7-halogenase, anthranilate 3-monooxygenase (FAD), 4-hydroxyphenylacetate 3-monooxygenase, and nitrilotriacetate monooxygenase), with reduced iron-sulfur protein as one donor, and incorporation of one atom of oxygen (e.g., camphor 5-monooxygenase, camphor 1,2-monooxygenase, alkane 1-monooxygenase, steroid 11β-monooxygenase, corticosterone 18-monooxygenase, cholesterol monooxygenase (side-chain-cleaving), choline monooxygenase, and steroid 15β-monooxygenase), with reduced pteridine as one donor, and incorporation of one atom of oxygen (e.g., phenylalanine 4-monooxygenase, tyrosine 3-monooxygenase, anthranilate 3-monooxygenase, tryptophan 5-monooxygenase, alkylglycerol monooxygenase, and mandelate 4-monooxygenase), with reduced ascorbate as one donor, and incorporation of one atom of oxygen (e.g, dopamine β-monooxygenase, peptidylglycine monooxygenase, and aminocyclopropanecarboxylate oxidase), with another compound as one donor, and incorporation of one atom of oxygen (e.g., monophenol monooxygenase, CMP-N-acetylneuraminate monooxygenase, and methane monooxygenase (particulate)), with oxidation of a pair of donors resulting in the reduction of molecular oxygen to two molecules of water (e.g., stearoyl-CoA 9-desaturase, acyl-[acyl-carrier-protein] desaturase, linoleoyl-CoA desaturase, $\Delta^8$-fatty-acid desaturase, $\Delta^{11}$-fatty-acid desaturase, $\Delta^{12}$-fatty-acid desaturase, and (S)-2-hydroxypropylphosphonic acid epoxidase), with 2-oxoglutarate as one donor, and the other dehydrogenated (e.g. deacetoxycephalosporin-C synthase), with NADH or NADPH as one donor, and the other dehydrogenated (e.g., (S)-stylopine synthase, (S)-cheilanthifoline synthase, berbamunine synthase, salutaridine synthase, (S)-canadine synthase, lathosterol oxidase, biflaviolin synthase, pseudobaptigenin synthase), and others including prostaglandin-endoperoxide synthase, kynurenine 7,8-hydroxylase, heme oxygenase, progesterone monooxygenase, steroid 17α-monooxygenase, steroid 21-monooxygenase, estradiol 6β-monooxygenase, 4-androstene-3,17-dione monooxygenase, progesterone 11α-monooxygenase, 4-methoxybenzoate monooxygenase (O-demethylating), plasmanylethanolamine desaturase, phylloquinone monooxygenase (2,3-epoxidizing), Latia-luciferin monooxygenase (demethylating), ecdysone 20-monooxygenase, 3-hydroxybenzoate 2-monooxygenase, steroid 9α-monooxygenase, 2-hydroxypyridine 5-monooxygenase, juglone 3-monooxygenase, linalool 8-monooxygenase, deoxyhypusine monooxygenase, myristoyl-CoA 11-(E) desaturase, myristoyl-CoA 11-(Z) desaturase, $\Delta^{12}$-fatty acid dehydrogenase, monoprenyl isoflavone epoxidase, thiophene-2-carbonyl-CoA monooxygenase, β-carotene 15,15'-monooxygenase, taxadiene 5α-hydroxylase, cholesterol 25-hydroxylase, ammonia monooxygenase, 5,6-dimethylbenzimidazole synthase, all-trans-8'-apo-β-carotenal 15,15'-oxygenase, zeaxanthin 7,8-dioxygenase, β-amyrin 24-hydroxylase, diapolycopene oxygenase, and carotene ϵ-monooxygenase.

The oxidoreductases which act on superoxide as acceptor can include, but are not limited to, superoxide dismutase and superoxide reductase.

The oxidoreductases which act on metal ions can include, but are not limited to, those with $NAD^+$ or $NADP^+$ as acceptor (e.g., mercury(II) reductase, diferric-transferrin reductase, aquacobalamin reductase, cob(II)alamin reductase, aquacobalamin reductase (NADPH), cyanocobalamin reductase (cyanide-eliminating), ferric-chelate reductase (NADH), [methionine synthase] reductase, and ferric-chelate reductase (NADPH)), with oxygen as acceptor (e.g., ferroxidase), with quinone or similar compound as acceptor (e.g. ascorbate ferrireductase (transmembrane)), with flavin as acceptor (e.g. cob(II)yrinic acid a,c-diamide reductase), with other acceptors (e.g. iron:rusticyanin reductase).

The oxidoreductases which act on CH or $CH_2$ groups can include, but are not limited to, those with $NAD^+$ or $NADP^+$ as acceptor (e.g., CDP-4-dehydro-6-deoxyglucose reductase, 4-hydroxy-3-methylbut-2-enyl diphosphate reductase, leucoanthocyanidin reductase, xanthine dehydrogenase, and nicotinate dehydrogenase), with a cytochrome as acceptor (e.g. nicotinate dehydrogenase (cytochrome)), with oxygen as acceptor (e.g., pteridine oxidase, xanthine oxidase, and 6-hydroxynicotinate dehydrogenase), with a disulfide as acceptor (e.g., ribonucleoside-diphosphate reductase, and ribonucleoside-triphosphate reductase), with a quinine or similar compound as acceptor (e.g., phenylacetyl-CoA dehydrogenase and caffeine dehydrogenase), with an iron-sulfur protein as acceptor (e.g., (E)-4-hydroxy-3-methylbut-2-enyl-diphosphate synthase), and with other acceptors (e.g., 4-methylphenol dehydrogenase (hydroxylating), ethylbenzene hydroxylase, 3α,7α,12α-trihydroxy-5β-cholestanoyl-CoA 24-hydroxylase, uracil/thymine dehydrogenase, and bile-acid 7α-dehydroxylase).

The oxidoreductases which act on iron-sulfur proteins as donors can include, but are not limited to, those with NAD+ or NADP+ as acceptor (e.g., rubredoxin—$NAD^+$ reductase, ferredoxin—$NADP^+$ reductase, ferredoxin—$NAD^+$ reductase, and rubredoxin—$NAD(P)^+$ reductase), with $H^+$ as acceptor, and with dinitrogen as acceptor (e.g., nitrogenase).

The oxidoreductases which act on reduced flavodoxin as donor can include, but are not limited to, those with dinitrogen as acceptor (e.g., nitrogenase (flavodoxin)).

The oxidoreductases which act on phosphorus or arsenic in donors can include, but are not limited to, those with $NAD(P)^+$ as acceptor (e.g. phosphonate dehydrogenase), with a cytochrome as acceptor (e.g., arsenate reductase (cytochrome c)), with disulfide as acceptor (e.g., arsenate reductase (glutaredoxin), methylarsonate reductase, and mycoredoxin), with a copper protein as acceptor (e.g. arsenate reductase (azurin)), and with other acceptors (e.g. arsenate reductase (donor)).

The oxidoreductases which act on X—H and Y—H to form an X—Y bond can include, but are not limited to, those with oxygen as acceptor (e.g., isopenicillin-N synthase, columbamine oxidase, reticuline oxidase, sulochrin oxidase [(+)-bisdechlorogeodin-forming], sulochrin oxidase [(−)-bisdechlorogeodin-forming], and aureusidin synthase), with a disulfide as acceptor (e.g., D-proline reductase (dithiol), glycine reductase, sarcosine reductase, and betaine reductase), and with other acceptors (e.g., β-cyclopiazonate dehydrogenase).

The oxidoreductases which act on halogen in donors can include, but are not limited to, those with $NAD^+$ or $NADP^+$ as acceptor (e.g. iodotyrosine deiodinase).

Other oxidoreductases can include, but are not limited to, chlorate reductase, pyrogallol hydroxyltransferase, sulfur reductase, [formate-C-acetyltransferase]activating enzyme, tetrachloroethene reductive dehalogenase, selenate reductase, thyroxine 5'-deiodinase, thyroxine 5-deiodinase, and photosystem I).

Suitable oxidoreductases include various sugar oxidases, laccases, peroxidases and haloperoxidases.

Glycosylases

Glycosylases include glycosidases, i.e. enzymes hydrolyzing O- and S-glycosyl compounds, including but not limited to α-amylase, β-amylase, glucan 1,4-α-glucosidase, cellulase, endo-1,3(4)-β-glucanase, inulinase, endo-1,4-β-xylanase, oligo-1,6-glucosidase, dextranase, chitinase, polygalacturonase, lysozyme, exo-α-sialidase, α-glucosidase, β-glucosidase, α-galactosidase, β-galactosidase, α-mannosidase, β-mannosidase, β-fructofuranosidase, α,α-trehalase, β-glucuronidase, endo-1,3-β-xylanase, amylo-1,6-glucosidase, hyaluronoglucosaminidase, hyaluronoglucuronidase, xylan 1,4-β-xylosidase, β-D-fucosidase, glucan endo-1,3-β-D-glucosidase, α-L-rhamnosidase, pullulanase, GDP-glucosidase, β-L-rhamnosidase, fucoidanase, glucosylceramidase, galactosylceramidase, galactosylgalactosylglucosylceramidase, sucrose α-glucosidase, α-N-acetylgalactosaminidase, α-N-acetylglucosaminidase, α-L-fucosidase, β-L-N-acetylhexosaminidase, β-N-acetylgalactosaminidase, cyclomaltodextrinase, α-N-arabinofuranosidase, glucuronosyl-disulfoglucosamine glucuronidase, isopullulanase, glucan 1,3-β-glucosidase, glucan endo-1,3-α-glucosidase, glucan 1,4-α-maltotetraohydrolase, mycodextranase, glycosylceramidase, 1,2-α-L-fucosidase, 2,6-β-fructan 6-levanbiohydrolase, levanase, quercitrinase, galacturan 1,4-α-galacturonidase, isoamylase, glucan 1,6-α-glucosidase, glucan endo-1,2-β-glucosidase, xylan 1,3-β-xylosidase, licheninase, glucan 1,4-β-glucosidase, glucan endo-1,6-β-glucosidase, L-iduronidase, mannan 1,2-(1,3)-α-mannosidase, mannan endo-1,4-β-mannosidase, fructan β-fructosidase, β-agarase, exo-poly-α-galacturonosidase, κ-carrageenase, glucan 1,3-α-glucosidase, 6-phospho-β-galactosidase, 6-phospho-β-glucosidase, capsular-polysaccharide endo-1,3-α-galactosidase, β-L-arabinosidase, arabinogalactan endo-1,4-β-galactosidase, cellulose 1,4-β-cellobiosidase (non-reducing end), peptidoglycan β-N-acetylmuramidase, α,α-phosphotrehalase, glucan 1,6-α-isomaltosidase, dextran 1,6-α-isomaltotriosidase, mannosyl-glycoprotein endo-β-N-acetylglucosaminidase, endo-α-N-acetylgalactosaminidase, glucan 1,4-α-maltohexaosidase, arabinan endo-1,5-α-L-arabinanase, mannan 1,4-mannobiosidase, mannan endo-1,6-α-mannosidase, blood-group-substance endo-1,4-β-galactosidase, keratan-sulfate endo-1,4-β-galactosidase, steryl-β-glucosidase, strictosidine β-glucosidase, mannosyl-oligosaccharide glucosidase, protein-glucosylgalactosylhydroxylysine glucosidase, lactase, endogalactosaminidase, 1,3-α-L-fucosidase, 2-deoxyglucosidase, mannosyl-oligosaccharide 1,2-α-mannosidase, mannosyl-oligosaccharide 1,3-1,6-α-mannosidase, branched-dextran exo-1,2-α-glucosidase, glucan 1,4-α-maltotriohydrolase, amygdalin β-glucosidase, prunasin β-glucosidase, vicianin β-glucosidase, oligoxyloglucan β-glycosidase, polymannuronate hydrolase, maltose-6'-phosphate glucosidase, endoglycosylceramidase, 3-deoxy-2-octulosonidase, raucaffricine β-glucosidase, coniferin β-glucosidase, 1,6-α-L-fucosidase, glycyrrhizinate β-glucuronidase, endo-α-sialidase, glycoprotein endo-α-1,2-mannosidase, xylan α-1,2-glucuronosidase, chitosanase, glucan 1,4-α-maltohydrolase, difructose-anhydride synthase, neopullulanase, glucuronoarabinoxylan endo-1,4-β-xylanase, mannan exo-1,2-1,6-α-mannosidase, α-glucuronidase, lacto-N-biosidase, 4-α-D-{(1→4)-α-D-glucano}trehalose trehalohydrolase, limit dextrinase, poly (ADP-ribose) glycohydrolase, 3-deoxyoctulosonase, galactan 1,3-β-galactosidase, β-galactofuranosidase, thioglucosidase, β-primeverosidase, oligoxyloglucan reducing-end-specific cellobiohydrolase, xyloglucan-specific endo-β-1,4-glucanase, mannosylglycoprotein endo-β-mannosidase, fructan β-(2,1)-fructosidase, fructan β-(2,6)-fructosidase, xyloglucan-specific exo-β-1,4-glucanase, oligosaccharide reducing-end xylanase, ι-carrageenase, α-agarase, α-neoagaro-oligosaccharide hydrolase, β-apiosyl-β-glucosidase, λ-carrageenase, 1,6-α-D-mannosidase, galactan endo-1,6-β-galactosidase, exo-1,4-β-D-glucosaminidase, heparanase, baicalin-β-D-glucuronidase, hesperidin 6-O-α-L-rhamnosyl-β-D-glucosidase, protein O-GlcNAcase, mannosylglycerate hydrolase, rhamnogalacturonan hydrolase, unsaturated rhamnogalacturonyl hydrolase, rhamnogalacturonan galacturonohydrolase, rhamnogalacturonan rhamnohydrolase, β-D-glucopyranosyl abscisate β-glucosidase, cellulose 1,4-β-cellobiosidase (reducing end), α-D-xyloside xylohydrolase, and β-porphyranase.

Glycosylases also include hydrolyzing N-glycosyl compounds, including but not limited to purine nucleosidase, inosine nucleosidase, uridine nucleosidase, AMP nucleosidase, $NAD^+$ nucleosidase, $NAD(P)^+$ nucleosidase, adenosine nucleosidase, ribosylpyrimidine nucleosidase, adenosylhomocysteine nucleosidase, pyrimidine-5'-nucleotide nucleosidase, β-aspartyl-N-acetylglucosaminidase, inosinate nucleosidase, 1-methyladenosine nucleosidase, NMN nucleosidase, DNA-deoxyinosine glycosylase, methylthioadenosine nucleosidase, deoxyribodipyrimidine endonucleosidase, ADP-ribosylarginine hydrolase, DNA-3-methyladenine glycosylase I, DNA-3-methyladenine glycosylase II, rRNA N-glycosylase, DNA-formamidopyrimidine glycosylase, ADP-ribosyl-[dinitrogen reductase] hydrolase, N-methyl nucleosidase, futalosine hydrolase, uracil-DNA glycosylase, double-stranded uracil-DNA glycosylase, and thymine-DNA glycosylase, and hydrolyzing S-glycosyl compounds.

Hydrolases

Hydrolases of EC 3 include, but are not limited to: those acting on ester bonds; glycosylases, those acting on ether bonds; those acting on peptide bonds (peptidases/proteases); those acting on carbon-nitrogen bonds, other than peptide bonds; those acting on acid anhydrides; those acting on carbon-carbon bonds; those acting on halide bonds; those acting on phosphorus-nitrogen bonds; those acting on sulfur-nitrogen bonds; those acting on carbon-phosphorus bonds; those acting on sulfur-sulfur bonds; and those acting on carbon-sulfur bonds.

The hydrolases of EC 3 which act on ester bonds, can include, but are not limited to, carboxylic ester hydrolases (for example lipases including triacylglycerol lipase, phospholipase $A_1$, phospholipase $A_2$, lysophospholipase, acylglycerol lipase, galactolipase, lipoprotein lipase; and phosphoric diester hydrolases including phosphlipase C, phospholipase D, phosphoinositide phospholipase C, glycosylphosphatidylinositol phospholipase D, and N-acetylphosphatidylethanolamine-hydrolysing phospholipase D) and glycosylases, including glycosidases, i.e. enzymes hydrolysing O- and S-glycosyl compounds, for example amylases (including alpha-amylase, beta-amylase, and isoamylase), cellulases, and mannanases.

Suitable lipases and cutinases include those of bacterial or fungal origin. Chemically modified or protein engineered mutants are included. Examples include lipase from *Thermomyces*, e.g., from *T. lanuginosus* (previously named *Humicola lanuginosa*) as described in EP 258 068 (and U.S. Pat. No. 4,810,414) and EP 305 216 (and U.S. Pat. Nos. 5,766,912; 5,874,558; 5,965,384; 7,517,668; 5,536,661 and 5,863,759), cutinase from *Humicola*, e.g. *H. insolens* as described in WO 96/13580, a *Pseudomonas lipase*, e.g., from *P. alcaligenes* or *P. pseudoalcaligenes* (EP 218 272, U.S. Pat. Nos. 5,766,912; 5,863,759; 5,874,558; 5,965,384; 7,517,668 and 5,536,661), *P. cepacia* (EP 331 376 and U.S. Pat. No. 5,290,694), *P. stutzeri* (GB 1,372,034), *P. fluorescens, Pseudomonas* sp. strain SD 705 (WO 95/06720, U.S. Pat. No. 5,827,718, WO 96/27002, and U.S. Pat. No. 5,942,431), *P. wisconsinensis* (WO 96/12012), a *Bacillus lipase*, e.g., from *B. subtilis* (Dartois et al., 1993, *Biochemica et Biophysica Acta,* 1131: 253-360), *B. stearothermophilus* (JP 64/744992) or *B. pumilus* (WO 91/16422 and U.S. Pat. No. 5,427,936). Other examples are lipase variants such as those described in WO 92/05249, WO 94/01541, EP 407 225, EP 260 105, WO 95/35381, WO 96/00292, WO 95/30744, WO 94/25578, WO 95/14783, WO 95/22615, WO 97/04079, WO 97/07202, WO 00/060063, WO2007/087508, WO 2009/109500 and U.S. Pat. Nos. 5,892,013; 5,869,438; 5,976,855; 6,020,180; 6,074,863; 5,658,871; 4,760,025; 5,155,033; 5,182,204; 5,185,258; 5,204,015; 5,244,791; 5,264,366; 5,310,675; 5,316,941; 5,346,823; 5,352,594; 5,371,008; 5,371,190; 5,411,873; 5,441,882; 5,472,855; 5,652,136; 5,700,676; 5,763,257; 5,801,038; 5,939,315; 5,955,340; 5,972,682; 6,465,235; and RE34,606. Preferred commercially available lipase enzymes include Lipolase™, Lipolase Ultra™, and Lipex™; Lecitase™, Lipolex™; Lipoclean™, Lipoprime™ (Novozymes A/S). Other commercially available lipases include Lumafast (Genencor Int Inc); Lipomax (Gist-Brocades/Genencor Int Inc) and *Bacillus* sp lipase from Solvay.

Suitable amylases (α and/or β) include those of bacterial or fungal origin. Chemically modified or protein engineered mutants are included. Amylases include, for example, α-amylases obtained from *Bacillus*, e.g., a special strain of *Bacillus licheniformis*, described in more detail in GB 1,296,839. Examples of useful amylases are the variants described in WO 94/02597, WO 94/18314, WO 96/23873, WO 97/43424, U.S. Pat. Nos. 5,824,532; 5,849,549; 6,297,037; 6,093,562; 6,297,038; 6,867,031; and US Publication Nos. 2002/0098996; 2003/0064908; 2004/0253676; 2005/0059131; 2005/0250664; 2006/0035323; 2009/0280527; 2010/0099597; 2010/0099598; and 2011/0177990, especially the variants with substitutions in one or more of the following positions: 15, 23, 105, 106, 124, 128, 133, 154, 156, 181, 188, 190, 197, 202, 208, 209, 243, 264, 304, 305, 391, 408, and 444. Commercially available amylases are Duramyl™, Termamyl™, Fungamyl™ and BAN™ (Novozymes A/S), Rapidase™ and Purastar™ (from Genencor International Inc.)

Suitable cellulases include those of bacterial or fungal origin. Chemically modified or protein engineered mutants are included. Suitable cellulases include cellulases from the genera *Bacillus, Pseudomonas, Humicola, Fusarium, Thielavia, Acremonium*, e.g., the fungal cellulases produced from *Humicola insolens, Myceliophthora thermophila* and *Fusarium oxysporum* disclosed in U.S. Pat. Nos. 4,435,307; 5,648,263; 5,691,178; 5,776,757 and WO 89/09259. Especially suitable cellulases are the alkaline or neutral cellulases having color care benefits. Examples of such cellulases are cellulases described in EP 0 495 257, EP 0 531 372, WO 96/11262, WO 96/29397, WO 98/08940, U.S. Pat. Nos. 5,520,838; 5,443,750; 5,668,073; 5,948,672; 6,423,524; 5,919,691; 6,071,735; 6,001,639; 6,387,690; 6,855,531; 7,226,773; and US Publication Nos. 2001/0036910; 2003/0119167; 2003/0054539; 2005/0070003; 2008/0145912; and 2010/0107342. Other examples are cellulase variants such as those described in WO 94/07998, EP 0 531 315, WO 95/24471, WO 98/12307, PCT/DK98/00299, U.S. Pat. Nos. 5,457,046; 5,686,593; 5,763,254; 5,792,641; 6,114,296; 5,457,046; 5,912,157; 6,117,664; 7,993,898; 8,017,372; and US Publication Nos. 2003/0092097; 2005/0009166; 2008/0206836; 2009/0170747 and 2011/0250674. Commercially available cellulases include Celluzyme™, and Carezyme™ (Novozymes A/S), Clazinase™, and Puradax HA™ (Genencor International Inc.), and KAC-500(B)™ (Kao Corporation).

Peptidases/Proteases

The hydrolases of EC 3 which act on peptide bonds (peptidases/proteases) can include, but are not limited to aminopeptidases (including leucyl aminopeptidase, membrane alanyl aminopeptidase, cystinyl aminopeptidase, tripeptide aminopeptidase, prolyl aminopeptidase, arginyl aminopeptidase, glutamyl aminopeptidase, Xaa-Pro aminopeptidase, bacterial leucyl aminopeptidase, clostridial aminopeptidase, cytosol alanyl aminopeptidase, lysyl aminopeptidase, Xaa-Trp aminopeptidase, tryptophanyl aminopeptidase, methionyl aminopeptidase, D-stereospecific aminopeptidase, aminopeptidase Ey, aspartyl aminopeptidase, aminopeptidase I, PepB aminopeptidase, aminopeptidase S, beta-peptidyl aminopeptidase, and intermediate cleaving peptidase 55); dipeptidases (including Xaa-Arg dipeptidase. Xaa-methyl-His dipeptidase, Glu-Glu dipeptidase, Xaa-Pro dipeptidase, Met-Xaa dipeptidase, non-stereospecific dipeptidase, cytosol nonspecific dipeptidase, membrane dipeptidase, beta-Ala-His dipeptidase, dipeptidase E, and D-Ala-D-Ala dipeptidase); Dipeptidyl-peptidases and tripeptidyl-peptidases (including dipeptidyl-peptidase I, dipeptidyl-peptidase II, dipeptidyl-peptidase III, dipeptidyl-peptidase IV, dipeptidyl-dipeptidase, tripeptidyl-peptidase I, tripeptidyl-peptidase II, Xaa-Pro dipeptidyl-peptidase, and prolyltripeptidyl aminopeptidase); peptidyl-dipeptidases (including peptidyl-dipeptidase A, peptidyl-dipeptidase B, peptidyl-dipeptidase Dcp, and cyanophycinase); serine-type carboxypeptidases (including lysosomal Pro-Xaa carboxypeptidase, serine-type D-Ala-D-Ala carboxypeptidase, carboxypeptidase C, and carboxypeptidase D); metallocarboxypeptidases (including carboxypeptidase A, carboxypeptidase B, lysine carboxypeptidase, Gly-Xaa carboxypeptidase, alanine carboxypeptidase, muramoylpentapeptide carboxypeptidase, carboxypeptidase E, glutamate carboxypeptidase, carboxypeptidase M, muramoyltetrapeptide carboxypeptidase, zinc D-Ala-D-Ala carboxypeptidase, carboxypeptidase A2, membrane Pro-Xaa carboxypeptidase, tubulinyl-Tyr carboxypeptidase, carboxypeptidase T, carboxypeptidase Taq, carboxypeptidase U, glutamate carboxypeptidase II, metallocarboxypeptidase D, and angiotensin-converting enzyme 2); ccysteine-type carboxypeptidases, including cathepsin X; omega peptidases (including acylaminoacyl-peptidase, peptidyl-glycinamidase, pyroglutamyl-peptidase I, beta-aspartyl-peptidase, pyroglutamyl-peptidase II, N-formylmethionyl-peptidase, gamma-glutamyl hydrolase, gamma-D-glutamyl-meso-diaminopimelate peptidase I, and ubiquitinyl hydrolase 1); serine endopeptidases (including chymotrypsin, chymotrypsin C, metridin, trypsin, thrombin, coagulation factor Xa, plasmin, enteropeptidase, acrosin, alpha-Lytic endopeptidase, glutamyl endopeptidase, cathepsin G, coagulation factor VIIa, coagulation factor IXa, cucumisin, prolyl oligopeptidase, coagulation factor XIa, brachyuran, plasma kallikrein, tissue kallikrein, pancreatic elastase, leukocyte elastase, coagulation factor XIIa, chymase, complement subcomponent $\overline{C^{1r}}$, complement subcomponent $\overline{C^{1s}}$, classical-complement-pathway C3/C5 convertase, complement factor I, complement factor D, alternative-complement-pathway C3/C5 convertase, cerevisin, hypodermin C, lysyl endopeptidase, endopeptidase La, gamma-renin, venombin AB, leucyl endopeptidase, tryptase, scutelarin, kexin, subtilisin, oryzin, peptidase K, thermomycolin, thermitase, endopeptidase So, t-plasminogen activator, protein C (activated), pancreatic endopeptidase E, pancreatic elastase II, IgA-specific serine endopeptidase, u-plasminogen activator, venombin A, furin, myeloblastin, semenogelase, granzyme A, granzyme B, streptogrisin A, streptogrisin B, glutamyl endopeptidase II oligopeptidase B, limulus clotting factor $\overline{C}$, limulus clotting factor $\overline{B}$, limulus clotting enzyme, repressor LexA, signal peptidase I, togavirin, flavivirin, endopeptidase Clp, proprotein convertase 1, proprotein convertase 2, snake venom factor V activator, lactocepin, assembling, hepacivirin, spermosin, sedolisin, xanthomonalisin, C-terminal processing peptidase, physarolisin, mannan-binding lectin-associated serine protease-2, rhomboid protease, hepsin, peptidase Do, HtrA2 peptidase, matriptase, C5a peptidase, sub-aqualysin 1, site-1 protease, pestivirus NS3 polyprotein peptidase, equine arterivirus serine peptidase, infectious pancreatic necrosis birnavirus Vp4 peptidase, SpoIVB peptidase, stratum corneum chymotryptic enzyme, kallikrein 8, kallikrein 13, and oviductin); cysteine endopeptidases (including cathepsin B, papain, ficain, chymopapain, asclepain, clostripain, streptopain, actimidain, cathepsin L, cathepsin H, cathepsin T, glycyl endopeptidase, cancer procoagulant, cathepsin S, picornain 3C, picornain 2A, caricain, ananain, stem bromelain, fruit bromelain, legumain, histolysain, caspase-1, gingipain R, cathepsin K, adenain, bleomycin hydrolase, cathepsin F, cathepsin V, cathepsin O, nuclear-inclusion-a endopeptidase, helper-component proteinase, L-peptidase, gingipain K, staphopain, separase, V-cath endopeptidase, cruzipain, calpain-1, calpain-2, calpain-3, caspase-2, caspase-3, caspase-4, caspase-5, caspase-6, caspase-7, caspase-8, caspase-9, caspase-10, caspase-11, peptidase 1 (mite), calicivirin, zingipain, Ulp1 peptidase, SARS coronavirus main proteinase, sortase A, and sortase B); aspartic endopeptidases (including pepsin A, pepsin B, gastricsin, chymosin, cathepsin D, nepenthesin, renin, HIV-1 retropepsin, Pro-opiomelanocortin converting enzyme, aspergillopepsin I, aspergillopepsin II, penicillopepsin, rhizopuspepsin, endothiapepsin, mucorpepsin, candidapepsin, saccharopepsin, rhodotorulapepsin, acrocylindropepsin, polyporopepsin, pycnoporopepsin, scytalidopepsin A, scytalidopepsin B, cathepsin E, barrierpepsin, signal peptidase II, plasmepsin I, plasmepsin II, phytepsin, yapsin 1, thermopsin, prepilin peptidase, nodavirus endopeptidase, memapsin 1, memapsin 2, HIV-2 retropepsin, plasminogen activator Pla, omptin, human endogenous retrovirus K endopeptidase, and HycI peptidase); metalloendopeptidases (including atrolysin A, microbial collagenase, leucolysin, interstitial collagenase, neprilysin, envelysin, IgA-specific metalloendopeptidase, procollagen N-endopeptidase, thimet oligopeptidase, neurolysin, stromelysin 1, meprin A, procollagen C-endopeptidase, peptidyl-Lys metalloendopeptidase, astacin, stromelysin 2, matrilysin, gelatinase A, vibriolysin, pseudolysin, thermolysin, bacillolysin, aureolysin, coccolysin, mycolysin, β-lytic metalloendopeptidase, peptidyl-Asp metalloendopeptidase, neutrophil collagenase, gelatinase B, leishmanolysin, saccharolysin, gametolysin, deuterolysin, serralysin, atrolysin B, atrolysin C, atroxase, atrolysin E, atrolysin F, adamalysin, horrilysin, ruberlysin, bothropasin, bothrolysin, ophiolysin, trimerelysin I, trimerelysin II, mucrolysin, pitrilysin, insulysin, O-sialoglycoprotein endopeptidase, russellysin, mitochondrial intermediate peptidase, dactylysin, nardilysin, magnolysin, meprin B, mitochondrial processing peptidase, macrophage elastase, choriolysin L, choriolysin H, tentoxilysin, bontoxilysin, oligopeptidase A, endothelin-converting enzyme, fibrolase, jararhagin, fragilysin, lysostaphin, flavastacin, snapalysin, gpr endopeptidase, pappalysin-1, membrane-type matrix metalloproteinase-1, ADAM10 endopeptidase, ADAMTS-4 endopeptidase, anthrax lethal factor endopeptidase, Ste24 endopeptidase, S2P endopeptidase, ADAM 17 endopeptidase, and ADAMTS13 endopeptidase); and threonine endopeptidases (including proteasome endopeptidase complex and Hs1U-Hs1V peptidase).

Suitable proteases include those of animal, vegetable or microbial origin. Microbial origin is preferred. Chemically modified or protein engineered mutants are included. The protease may be a serine protease or a metalloprotease, preferably an alkaline microbial protease or a trypsin-like protease. Examples of alkaline proteases are subtilisins, especially those derived from *Bacillus*, e.g., subtilisin Novo, subtilisin Carlsberg, subtilisin 309, subtilisin 147 and subtilisin 168 (described in WO 89/06279, U.S. Pat. Nos. 6,506,589; 6,808,913; 6,835,821; and US Publication Nos. 2003/0148495; 2003/0175933; 2003/0186378 and 2005/0003986). Examples of trypsin-like proteases are trypsin (e.g., of porcine or bovine origin) and the *Fusarium* protease described in WO 89/06270, WO 94/25583, and U.S. Pat. Nos. 5,288,627 and 5,693,520. Examples of useful proteases are the variants described in WO 92/19729, WO 98/20115, WO 98/20116, WO 98/34946, and U.S. Pat. Nos. 5,858,757; 6,300,116; 7,098,017; 6,159,731; and US Publication No. 2002/0102702, especially the variants with substitutions in one or more of the following positions: 27, 36, 57, 76, 87, 97, 101, 104, 120, 123, 167, 170, 194, 206, 218, 222, 224, 235, and 274. Preferred commercially available protease enzymes include Alcalase™, Savinase™, Primase™, Duralase™ Esperase™, and Kannase™ (Novozymes A/S), Maxatase™, Maxacal™, Maxapem™ Properase™, Purafect™, Purafect OxP™, FN2™, and FN3™ (Genencor International Inc.)

Enzymes for use in laundry and dishwashing applications can include one or more of protease, amylase, lipase, dehydrogenase, transaminase, kinase, cellulase, mannanase, peptidase, decarboxylase, isomerase, mutase, synthetase, synthase, and oxido-reductase enzymes, including oxido-reductase enzymes that catalyze the formation of bleaching agents.

It is contemplated that an enzyme for use in a composition described herein can come from any suitable source or combination of sources, for example bacterial, fungal, plant, or animal sources. In one type of embodiment, a mixture of two or more enzymes will come from at least two different types of sources. For example, a mixture of protease and lipase can come from a bacterial (protease) and fungal (lipase) sources.

In one type of embodiment, it is contemplated that the enzyme for use in a composition described herein is not amylase. In another type of embodiment, when only one type of enzyme is included in the composition, the enzyme is not amylase. In yet another type of embodiment, when two or more types of enzymes are included in the composition the two or more enzymes are not amylase. In still another type of embodiment, when two or more types of enzymes are included in the composition, one type of enzyme is amylase and another type of enzyme is not amylase.

Optionally, an enzyme for use herein, including but not limited to any enzyme class or member described herein, is one which works in alkaline pH conditions, e.g. for use in detergent applications including laundry detergent and/or dish detergent, for example but not limited to a pH in a range of about 7 to about 12, or greater than 7 to about 12, or about 8 to about 12, or about 8 to about 11. Optionally, an enzyme for use herein, including but not limited to any enzyme class or member described herein, is one which works in a temperature in a range of about 5° C. to about 45° C.

It is well known in the art that the quantity of enzyme used in any application is a function of the activity of the specific enzyme. While the activity of the enzyme is the important parameter, it is readily appreciated that this is not a unit of measure that can be easily used in production. Therefore, it is known in the art to characterize the enzyme according to the activity per gram of the dry enzyme mixture. The dry enzyme mixture may be of high purity and essentially 100% active enzyme or it may contain fermentation byproducts. Therefore a commercially available enzyme mixture may have a wide range of purity but can still be used in a formulation based on a reported activity per unit weight. As used herein, the phrase "enzyme mixture" will refer to the dry mixture of active enzyme and optional residual fermentation products. The total amount of active enzyme (or optionally, mixture of two or more enzymes) included in the water soluble film can be at least about 0.1 phr, optionally in a range of about 0.1 to about 20 phr, or to about 2 phr, 4 phr, 5 phr, 10 phr, or 15 phr, including such individual values and any combination of ranges formed by such values. In embodiments that include both a protease and a different, second enzyme, the protease activity to second enzyme activity ratio can be in any suitable range, for example in a range of about 0.2:1 to about 10:1, or about 0.25:1 to about 10:1, or about 0.2:1 to about 3:1, for example. The handling of dry powders of enzyme is not always desirable, particularly due to the safety hazards of handling enzyme dusts. Frequently enzyme mixtures are obtained as liquids with the enzyme dissolved in a carrier solvent. Enzyme solutions are characterized by the enzyme activity per unit weight (or volume) allowing for a specific weight or volume of enzyme mixture per batch. Suitable active enzymes are commercially available as solutions from suppliers including Novozymes, Genencor Int Inc, Kao Corporation and Gist-Brocades.

Enzyme Substrate

Water-soluble films according to the present disclosure can further include an enzyme stabilizer which is a functional substrate for one or more enzymes in the enzyme composition. Embodiments of enzyme substrates, when included in water-soluble films according to the present disclosure, have been shown to result in a percent recovery of enzymes in a range of about 20% to 100% recovery. In one type of embodiment, the inclusion of enzyme substrate can result in at least 70% recovery of enzyme activity. That is, at least 70% of enzyme activity was maintained following film formation. In another aspect, inclusion of an enzyme substrate can result in an increase in enzyme recovery of at least 5%, 10%, 20%, 30%, 40%, 50%, 60%, 70%, 80%, 90%, 100%, or more, for example up to 250% or more, relative to films with no enzyme substrate included, as demonstrated in the Examples below.

Enzyme substrates will be evident to the person of ordinary skill in the art in view of the present disclosure. For example, substrates can be selected from those donor and acceptor classes described above in connection with the types of enzymes. As specific examples, substrates for amylases will include complex sugars and starches, substrates for lipases will include lipids, for example glycerol monooleate, substrates for proteases will include proteins, for example a soy protein, substrates for cellulases will include celluloses, for example methyl cellulose, and substrates for mannanases will include mannan, for example, a guar gum.

The amount of the enzyme substrate incorporated into the film can be any suitable amount to provide the enzyme with functional substrate material during film processing and storage. Therefore, the amount of enzyme substrate to be incorporated into the film is an amount effective for increasing the stability of the enzyme and thus increasing the recovery of enzyme activity, following processing, for example film formation. In one type of embodiment, optionally the amount of enzyme substrate is not in great excess of the amount effective for increasing stability of the enzyme; for example, the amount of enzyme substrate in embodiments can be no more than 1.5 times the effective amount, or no more than 2 times the effective amount, or no more than 3 times the effective amount. In the alternative, the composition can contain an excess of enzyme substrate to ensure sufficient quantity for the enzyme loading in the composition, subject to the excess quantity not compromising other desired properties of the composition (e.g., film strength). For example, the enzyme substrate can be incorporated into the film in an amount of at least about 1 phr or at least 2 phr, optionally in a range of about 2 to about 8 phr. In other embodiments, the amount of enzyme substrate can be incorporated into the composition or film in an amount of 1 phr or less, or 2 phr or less, or 2.5 phr or less, or 3 phr or less, or 3.5 phr or less, or 4 phr or less, or 4.5 phr or less, or 5 phr or less, or 5.5 phr or less, or 6 phr or less, or 6.5 phr or less, or 7 phr or less, or 7.5 phr or less, or 8 phr or less, or 8.5 phr or less, or 9 phr or less. The ratio of substrate to enzyme mixture can be any suitable amount consistent with the disclosure herein, for example at least about 0.5:1.0, or at least about 2:0:1.0, in a range of about 0.5:1.0 to about 2.0:1.0, or at least about 0.5:1.0 to about 10:1, for example. Without intending to be bound by any particular theory, it is believed that the amount of substrate that is needed to stabilize the enzymes in the water-soluble compositions can depend upon one or more variables, including, but not limited to the weight of the substrate, molar concentration, steric availability, and processing temperatures. Suitable enzyme amounts in the composition and suitable substrate to enzyme ratios can be determined by routine experimentation, for example using the enzyme activity measurement technique described herein. Thus, for example when a glycerol monooleate is used as a substrate with a lipase, the glycerol monooleate can be provided in a ratio of the weight of the glycerol monooleate to the enzyme activity. Alternatively, for example, when a glycerol dioleate is used as a substrate with a lipase the glycerol dioleate can be provided in a ratio of half the weight of the glycerol dioleate to the enzyme activity (i.e., two available binding sites), however more may be needed if one of the binding sites is sterically inaccessible. Similarly, in the case of a protein-protease interaction, for example, it is believed that with a given weight ratio of protein to enzyme activity, a low molecular weight protein may provide better protection than a medium molecular weight protein (i.e., there will be more proteins available for interaction with a low molecular weight protein). In the case of a high molecular weight protein, the protection offered may be better than that of a medium molecular weight protein for a given weight ratio of protein to enzyme activity (i.e., the larger protein may be sterically available to more than one enzyme).

In one class of embodiments, the enzyme substrate will not provide any other function in the film other than to serve as a substrate for enzyme activity. Thus, for example, in one type of embodiment, the enzyme substrate will not act as a surfactant. In another non-exclusive type of embodiment, the enzyme substrate will not act as a plasticizer.

In another class of embodiments, the enzyme substrate may be the type that would provide secondary functionality to the film other than to serve as a substrate for enzyme activity, and in this class of embodiments the enzyme substrate can be included in amounts less than those necessary for the secondary function, or in excess of those necessary to provide the secondary function. Thus, for example, while starches can affect film performance as compounding agents, a starch can be included in a film herein in an amount that would not have a practical effect on the mechanical properties of the film, but in an amount which would be sufficient to act as an enzyme stabilizer in functioning as a substrate for enzyme activity.

Without intending to be bound by any particular theory, it is believed that the enzyme substrate improves enzyme activity recovery by one or both of two mechanisms. First, it is believed that when the enzyme is provided a substrate upon which to act, and thus the enzyme will be complexing with the substrate, the enzyme is less likely to denature by one or more of various mechanisms (e.g., heat, acid, alkali, radiation). Second, it is believed that when an enzyme is provided with a substrate upon which to act, and thus the enzyme will be complexing with the substrate, the enzyme is less likely to be subject to lysis by protease enzymes because the binding site(s) for lysis are occupied or otherwise sterically hindered. Thus, for example, in Example 6 below, the lipase (a fungal enzyme) apparently has no inherent resistance to the protease enzyme (a bacterial enzyme), and so recovery of lipase enzyme activity was undetectable. However, providing a lipase substrate in the film led to a surprising and substantial recovery of lipase enzyme activity.

The water-soluble films according to the present disclosure may include other optional additive ingredients including, but not limited to, plasticizers, surfactants, defoamers, film formers, antiblocking agents, caustic sodas, internal release agents, antiyellowing agents, colorants, including but not limited to dyes and pigments, and other functional ingredients, including but not limited to carriers and/or encapsulates containing perfume components, bleaching agents, or bleach catalysts, for example in amounts suitable for their intended purpose.

Water is recognized as a very efficient plasticizer for PVOH and other polymers; including but not limited to water soluble polymers, however, the volatility of water makes its utility limited since polymer films need to have at least some resistance (robustness) to a variety of ambient conditions including low and high relative humidity. Glycerin is much less volatile than water and has been well established as an effective plasticizer for PVOH and other polymers. Glycerin or other such liquid plasticizers by themselves can cause surface "sweating" and greasiness if the level used in the film formulation is too high. This can lead to problems in a film such as unacceptable feel to the hand of the consumer and even blocking of the film on the roll or in stacks of sheets if the sweating is not mitigated in some manner, such as powdering of the surface. This could be characterized as over plasticization. However, if too little plasticizer is added to the film the film may lack sufficient ductility and flexibility for many end uses, for example to be converted into a final use format such as pouches.

Plasticizers for use in water-soluble films of the present disclosure include, but are not limited to, sorbitol, glycerol, diglycerol, propylene glycol, ethylene glycol, diethyleneglycol, triethylene glycol, tetraethyleneglycol, polyethylene glycols up to MW 400, 2 methyl 1, 3 propane diol, lactic acid, monoacetin, triacetin, triethyl citrate, 1,3-butanediol, trimethylolpropane (TMP), polyether triol, and combinations thereof. As less plasticizer is used, the film can become more brittle, whereas as more plasticizer is used the film can lose tensile strength. Plasticizers can be included in the water-soluble films in an amount in a range of about 25 phr to about 50 phr, or from about 30 phr to about 45 phr, or from about 32 phr to about 42 phr, for example.

Surfactants for use in water-soluble films are well known in the art. Optionally, surfactants are included to aid in the dispersion of the resin solution upon casting. Suitable surfactants for water-soluble films of the present disclosure include, but are not limited to, dialkyl sulfosuccinates, lactylated fatty acid esters of glycerol and propylene glycol, lactylic esters of fatty acids, sodium alkyl sulfates, polysorbate 20, polysorbate 60, polysorbate 65, polysorbate 80, alkyl polyethylene glycol ethers, lecithin, acetylated fatty acid esters of glycerol and propylene glycol, sodium lauryl sulfate, acetylated esters of fatty acids, myristyl dimethylamine oxide, trimethyl tallow alkyl ammonium chloride, quaternary ammonium compounds, salts thereof and combinations of any of the forgoing. Too little surfactant can sometimes result in a film having holes, whereas too much surfactant can result in the film having a greasy or oily feel from excess surfactant present on the surface of the film. Thus, surfactants can be included in the water-soluble films in an amount of less than about 2 phr, for example less than about 1 phr, or less than about 0.5 phr, for example.

One type of secondary component contemplated for use is a defoamer. Defoamers can aid in coalescing of foam bubbles. Suitable defoamers for use in water-soluble films according to the present disclosure include, but are not limited to, hydrophobic silicas, for example silicon dioxide or fumed silica in fine particle sizes, including Foam Blast® defoamers available from Emerald Performance Materials, including Foam Blast® 327, Foam Blast® UVD, Foam Blast® 163, Foam Blast® 269, Foam Blast® 338, Foam Blast® 290, Foam Blast® 332, Foam Blast® 349, Foam Blast® 550 and Foam Blast® 339, which are proprietary, non-mineral oil defoamers. In embodiments, defoamers can be used in an amount of 0.5 phr, or less, for example, 0.05 phr, 0.04 phr, 0.03 phr, 0.02 phr, or 0.01 phr. Preferably, significant amounts of silicon dioxide will be avoided, in order to avoid stress whitening.

Processes for making water-soluble articles, including films, include casting, blow-molding, extrusion and blown extrusion, are known in the art. One contemplated class of embodiments is characterized by the water-soluble film described herein being formed by casting, for example, by admixing the ingredients described herein with water to create an aqueous mixture, for example a solution with optionally dispersed solids, applying the mixture to a surface, and drying off water to create a film. Similarly, other compositions can be formed by drying the mixture while it is confined in a desired shape.

While the present disclosure provides film examples, the compositions can take other forms and shapes, including those having thicknesses substantially in excess of what would normally be considered a film. Composition thicknesses (i.e. at their thinness point or average thickness), for film and non-film embodiments, can be in any desired range, including values and ranges of at least 0.1 μm at least 10 μm at least 50 μm at least 100 μm at least 1 mmm, at least 2 mm, at least 3 mm, at least 4 μm at least 5 mm, at least 10 mm, and in a range of 0.1 μm to 100 μm or 0.1 μm to 1000 μm for example.

In one contemplated class of embodiments, the water soluble film is formed by casting a water-soluble mixture wherein the water-soluble mixture is prepared according to the steps of:

(a) providing a mixture of water soluble resin, water, and any optional additives excluding enzymes;

(b) boiling the mixture for 30 minutes;

(c) degassing the mixture in an oven at a temperature of at least 40° C.; optionally in a range of 40° C. to 70° C., e.g. about 65° C.;

(d) adding at least one enzyme, optionally at least one plasticizer, and optionally additional water to the mixture at a temperature of 65° C. or less; and (e) stirring the mixture, optionally without vortex, until the mixture appears substantially uniform in color and consistency; optionally for a time period in a range of 30 minutes to 90 minutes, optionally at least 1 hour; and casting the mixture promptly after the time period of stirring (e.g. within 4 hours, or 2 hours, or within 1 hour or less). If the enzyme is added to the mixture too early, e.g. with the secondary additives or resin, the level of enzyme activity recovered may be low. Without intending to be bound by any particular theory, it is believed that boiling of the mixture with the enzyme leads to the enzyme denaturing and storing in solution for extended periods of time also leads to a reduction in recovered enzyme activity.

In one class of embodiments, high enzyme activity is maintained in the water soluble films according to the present disclosure by drying the films quickly under moderate to mild conditions. As used herein, drying quickly refers to a drying time of less than 24 hours, optionally less than 12 hours, optionally less than 8 hours, optionally less than 2 hours, optionally less than 1 hour, optionally less than 45 minutes, optionally less than 30 minutes, optionally less than 20 minutes, optionally less than 10 minutes, for example in a range of about 6 minutes to about 10 minutes, or 8 minutes. As used herein, moderate to mild conditions refer to drying temperatures of less than 170° F. (77° C.), optionally in a range of about 150° F. to about 170° F. (about 66° C. to about 77° C.), e.g. 165° F. (74° C.). As the drying temperature increases, the enzymes tend to denature faster, whereas as the drying temperature decreases, the drying time increases, thus exposing the enzymes to solution for an extended period of time.

The film is useful for creating a packet to contain a composition, for example laundry or dishwashing compositions, thereby forming a pouch. The film described herein can also be used to make a packet with two or more compartments made of the same film or in combination with films of other polymeric materials. Additional films can, for example, be obtained by casting, blow-molding, extrusion or blown extrusion of the same or a different polymeric material, as known in the art. In one type of embodiment, the polymers, copolymers or derivatives thereof suitable for use as the additional film are selected from polyvinyl alcohols, polyvinyl pyrrolidone, polyalkylene oxides, polyacrylic acid, cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides including starch and gelatin, natural gums such as xanthan, and carrageenans. For example, polymers can be selected from polyacrylates and water-soluble acrylate copolymers, methylcellulose, carboxymethylcellulose sodium, dextrin, ethylcellulose, hydroxyethyl cellulose, hydroxypropyl methylcellulose, maltodextrin, polymethacrylates, and combinations thereof, or selected from polyvinyl alcohols, polyvinyl alcohol copolymers and hydroxypropyl methyl cellulose (HPMC), and combinations thereof.

The pouches and/or packets of the present disclosure comprise at least one sealed compartment. Thus the pouches may comprise a single compartment or multiple compartments. The pouches may have regions with and without enzymes. In embodiments including multiple compartments, each compartment may contain identical and/or different compositions. In turn, the compositions may take any suitable form including, but not limited to liquid, solid and combinations thereof (e.g. a solid suspended in a liquid). In some embodiments, the pouches comprise a first, second and third compartment, each of which respectively contains a different first, second and third composition. In some embodiments, the compositions may be visually distinct as described in European Patent Application Number 09161692.0 (filed Jun. 2, 2009 and assigned to the Procter & Gamble Company), published as EP 2258820 (and counterpart US Patent Application Publication No. 2010/0305020).

The compartments of multi-compartment pouches and/or packets may be of the same or different size(s) and/or volume(s). The compartments of the present multi-compartment pouches can be separate or conjoined in any suitable manner. In some embodiments, the second and/or third and/or subsequent compartments are superimposed on the first compartment. In one embodiment, the third compartment may be superimposed on the second compartment, which is in turn superimposed on the first compartment in a sandwich configuration. Alternatively the second and third compartments may be superimposed on the first compartment. However it is also equally envisaged that the first, second and optionally third and subsequent compartments may be attached to one another in a side by side relationship. The compartments may be packed in a string, each compartment being individually separable by a perforation line. Hence each compartment may be individually torn-off from the remainder of the string by the end-user, In some embodiments, multi-compartment pouches and/or packets include three compartments consisting of a large first compartment and two smaller compartments. The second and third smaller compartments are superimposed on the first larger compartment. The size and geometry of the compartments are chosen such that this arrangement is achievable. The geometry of the compartments may be the same or different. In some embodiments the second and optionally third compartment each has a different geometry and shape as compared to the first compartment. In these embodiments, the second and optionally third compartments are arranged in a design on the first compartment. The design may be decorative, educative, or illustrative, for example to illustrate a concept or instruction, and/or used to indicate origin of the product. In some embodiments, the first compartment is the largest compartment having two large faces sealed around the perimeter, and the second compartment is smaller covering less than about 75%, or less than about 50% of the surface area of one face of the first compartment. In embodiments in which there is a third compartment, the aforementioned structure may be the same but the second and third compartments cover less than about 60%, or less than about 50%, or less than about 45% of the surface area of one face of the first compartment.

The pouches and/or packets of the present disclosure may comprise one or more different films. For example, in single compartment embodiments, the packet may be made from one wall that is folded onto itself and sealed at the edges, or alternatively, two walls that are sealed together at the edges. In multiple compartment embodiments, the packet may be made from one or more films such that any given packet compartment may comprise walls made from a single film or multiple films having differing compositions. In one embodiment, a multi-compartment pouch comprises at least three walls: an outer upper wall; an outer lower wall; and a partitioning wall. The outer upper wall and the outer lower wall are generally opposing and form the exterior of the pouch. The partitioning wall is interior to the pouch and is secured to the generally opposing outer walls along a seal line. The partitioning wall separates the interior of the multi-compartment pouch into at least a first compartment and a second compartment. In one class of embodiments, the partitioning wall may be the only enzyme containing film thereby minimizing the exposure of the consumer to the enzymes.

Pouches and packets may be made using any suitable equipment and method. For example, single compartment pouches may be made using vertical form filling, horizontal form filling, or rotary drum filling techniques commonly known in the art. Such processes may be either continuous or intermittent. The film may be dampened, and/or heated to increase the malleability thereof. The method may also involve the use of a vacuum to draw the film into a suitable mold. The vacuum drawing the film into the mold can be applied for about 0.2 to about 5 seconds, or about 0.3 to about 3, or about 0.5 to about 1.5 seconds, once the film is on the horizontal portion of the surface. This vacuum can be such that it provides an under-pressure in a range of 10 mbar to 1000 mbar, or in a range of 100 mbar to 600 mbar, for example.

The molds, in which packets may be made, can have any shape, length, width and depth, depending on the required dimensions of the pouches. The molds may also vary in size and shape from one to another, if desirable. For example, the volume of the final pouches may be about 5 ml to about 300 ml, or about 10 to 150 ml, or about 20 to about 100 ml, and that the mold sizes are adjusted accordingly.

In one embodiment, the packet includes a first and a second sealed compartment. The second compartment is in a generally superposed relationship with the first sealed compartment such that the second sealed compartment and the first sealed compartment share a partitioning wall interior to the pouch.

In one embodiment, the packet including a first and a second compartment further includes a third sealed compartment. The third sealed compartment is in a generally superposed relationship with the first sealed compartment such that the third sealed compartment and the first sealed compartment share a partitioning wall interior to the pouch.

In various embodiments, the first composition and the second composition are selected from one of the following combinations: liquid, liquid; liquid, powder; liquid, gel; liquid, paste; powder, powder; powder, liquid; powder, gel; powder; paste; gel, liquid; gel, powder; gel, gel; gel, paste; paste, liquid; paste, powder; paste, gel; and paste, paste.

In various embodiments, the first, second and third compositions are selected from one of the following combinations:

powder, liquid, liquid; powder, liquid, powder; powder, liquid, gel; powder, liquid, paste; powder, powder, liquid; powder, powder, powder; powder, powder, gel; powder, powder, paste; powder, gel, liquid; powder, gel, powder; powder, gel, gel; powder, gel, paste; powder, paste, liquid; powder, paste, powder; powder, paste, gel; powder, paste, paste; liquid, liquid, liquid; liquid, liquid, powder; liquid, liquid, gel; liquid, liquid, paste; liquid, powder, liquid; liquid, powder, powder; liquid, powder, gel; liquid, powder, paste; liquid, gel, liquid; liquid, gel, powder; liquid, gel, gel; liquid, gel, paste; liquid, paste, liquid; liquid, paste, powder; liquid, paste, gel; liquid, paste, paste; gel, liquid, liquid; gel, liquid, powder; gel, liquid, gel; gel, liquid, paste; gel, powder, liquid; gel, powder, powder; gel, powder, gel; gel, powder, paste; gel, gel, liquid; gel, gel, powder; gel, gel, gel; gel, gel, paste; gel, paste, liquid; gel, paste, powder; gel, paste, gel; gel, paste, paste; paste, liquid, liquid; paste, liquid, powder; paste, liquid, gel; paste, liquid, paste; paste, powder, liquid; gel, powder, powder; gel, powder, gel; gel, powder, paste; paste, gel, liquid; paste, gel, powder; paste, gel, gel; paste, gel, paste; paste, paste, liquid; paste, paste, powder; paste, paste, gel; and paste, paste, paste.

In one embodiment, the single compartment or plurality of sealed compartments contains a composition. The plurality of compartments may each contain the same or a different composition. The composition is selected from a liquid, powder, gel, paste or combination thereof.

Heat can be applied to the film in the process commonly known as thermoforming. The heat may be applied using any suitable means. For example, the film may be heated directly by passing it under a heating element or through hot air, prior to feeding it onto a surface or once on a surface. Alternatively, it may be heated indirectly, for example by heating the surface or applying a hot item onto the film. The film can be heated using an infrared light. The film may be heated to a temperature of at least 50° C., for example about 50 to about 150° C., about 50 to about 120° C., about 60 to about 130° C., about 70 to about 120° C., or about 60 to about 90° C.

Alternatively, the film can be wetted by any suitable means, for example directly by spraying a wetting agent (including water, a solution of the film composition, a plasticizer for the film composition, or any combination of the foregoing) onto the film, prior to feeding it onto the surface or once on the surface, or indirectly by wetting the surface or by applying a wet item onto the film.

Once a film has been heated and/or wetted, it may be drawn into an appropriate mold, preferably using a vacuum. The film can be thermoformed with a draw ratio of at least about 1.5, for example, and optionally up to a draw ratio of 2, for example. The filling of the molded film can be accomplished by utilizing any suitable means. In some embodiments, the most preferred method will depend on the product form and required speed of filling. In some embodiments, the molded film is filled by in-line filling techniques. The filled, open packets are then closed forming the pouches, using a second film, by any suitable method. This may be accomplished while in horizontal position and in continuous, constant motion. The closing may be accomplished by continuously feeding a second film, preferably water-soluble film, over and onto the open packets and then preferably sealing the first and second film together, typically in the area between the molds and thus between the packets.

Any suitable method of sealing the packet and/or the individual compartments thereof may be utilized. Non-limiting examples of such means include heat sealing, solvent welding, solvent or wet sealing, and combinations thereof. The water-soluble packet and/or the individual compartments thereof can be heat sealed at a temperature of at least 200° F. (93° C.), for example in a range of about 220° F. (about 105° C.) to about 290° F. (about 145° C.), or about 230° F. (about 110° C.) to about 280° F. (about 140° C.). Typically, only the area which is to form the seal is treated with heat or solvent. The heat or solvent can be applied by any method, typically on the closing material, and typically only on the areas which are to form the seal. If solvent or wet sealing or welding is used, it may be preferred that heat is also applied. Preferred wet or solvent sealing/welding methods include selectively applying solvent onto the area between the molds, or on the closing material, by for example, spraying or printing this onto these areas, and then applying pressure onto these areas, to form the seal. Sealing rolls and belts as described above (optionally also providing heat) can be used, for example.

The formed pouches may then be cut by a cutting device. Cutting can be accomplished using any known method. It may be preferred that the cutting is also done in continuous manner, and preferably with constant speed and preferably while in horizontal position. The cutting device can, for example, be a sharp item, or a hot item, or a laser, whereby in the latter cases, the hot item or laser 'burns' through the film/sealing area.

The different compartments of a multi-compartment pouches may be made together in a side-by-side style wherein the resulting, conjoined pouches may or may not be separated by cutting. Alternatively, the compartments can be made separately.

In some embodiments, pouches may be made according to a process including the steps of:

a) forming a first compartment (as described above);

b) forming a recess within some or all of the closed compartment formed in step (a), to generate a second molded compartment superposed above the first compartment;

c) filling and closing the second compartments by means of a third film;

d) sealing the first, second and third films; and e) cutting the films to produce a multi-compartment pouch.

The recess formed in step (b) may be achieved by applying a vacuum to the compartment prepared in step (a).

In some embodiments, second, and/or third compartment(s) can be made in a separate step and then combined with the first compartment as described in European Patent Application Number 08101442.5 or WO 2009/152031 (filed Jun. 13, 2008 and assigned to the Procter & Gamble Company).

In other embodiments, pouches may be made according to a process including the steps of:

a) forming a first compartment, optionally using heat and/or vacuum, using a first film on a first forming machine;

b) filling the first compartment with a first composition;

c) on a second forming machine, deforming a second film, optionally using heat and vacuum, to make a second and optionally third molded compartment;

d) filling the second and optionally third compartments;

e) sealing the second and optionally third compartment using a third film;

f) placing the sealed second and optionally third compartments onto the first compartment;

g) sealing the first, second and optionally third compartments; and h) cutting the films to produce a multi-compartment pouch.

The first and second forming machines may be selected based on their suitability to perform the above process. In some embodiments, the first forming machine is preferably a horizontal forming machine, and the second forming machine is preferably a rotary drum forming machine, preferably located above the first forming machine.

It should be understood that by the use of appropriate feed stations, it may be possible to manufacture multi-compartment pouches incorporating a number of different or distinctive compositions and/or different or distinctive powder, liquid, gel or paste compositions.

The water-soluble films in accordance with the disclosure can be better understood in light of the following examples, which are merely intended to illustrate the water-soluble films and water-soluble packets and are not meant to limit the scope thereof in any way.

EXAMPLES

Colorimetric Measurement of Protease Activity

The protease used is known to hydrolyze N,N-dimethyl-casein (DMC). By the hydrolysis of peptide bonds, carboxylic acids and primary amines were produced. The produced amines reacted under alkaline conditions with tri-nitrobenzene-sulfonic acid (TNBS) to form a colored complex. The colored complex was detected at 405 nm. The reaction between the primary amines and TNBs was assumed to be faster than the cleavage of DMC. Therefore, the reaction in the presence of excess substrate can be assumed to be a function of the enzyme concentration only.

Protease activity was determined relative to an enzyme standard. The standard was a sample of the raw material protease composition that was used to prepare the film composition according to the Examples herein. The result is reported in convenient units of enzyme activity, for example katals (Eur. J. Biochemistry, Vol 97, 319-320, 1979). A set of standards was prepared through serial dilutions using an enzyme of known activity. The standards were buffered to pH 8.3, were stirred for 9 minutes at 40° C., and the absorbance at 405 nm was measured. The absorbance was corrected to account for a blank, and a calibration curve (linear) was obtained by plotting the activity versus the corrected absorbance. The calibration curve was accepted if $r^2$ was greater than 0.995. A sample of enzyme-containing film according to the corresponding Example was weighed and dissolved in a standard solution of DMC and TNBS, buffered to pH 8.3, and was stirred for 9 minutes at 40° C. The absorbance at 405 nm was measured at 40° C. Using the absorbance value, the activity per gram of film was determined. Each film composition was tested in multiple replicates, and the average value is reported herein.

Colorimetric Measurement of Amylase Activity

The substrate 4,6-ethylidene-(G7)-p-nitrophenyl-(G1)-α-D-maltoheptaosid (ethylidene-G7pNP) was hydrolyzed by α-amylase to G2pNP, G3pNP and G4pNP. These fragments were totally hydrolyzed to p-nitrophenol (pNP) and glucose by an α-glucodiase. The intensity of the formed pNP was proportional to the α-amylase activity of the sample. The pNP was detected at 405 nm.

α-amylase activity was determined relative to an enzyme standard. The standard was a sample of the raw amylase composition that was used to prepare the film composition according to the Examples herein. Standards were prepared at a pH of 7.35, were stirred for 4 minutes at 27° C., and the absorbance was measured at 405 nm. A calibration curve (linear) was obtained, as described above. A sample of enzyme-containing film of the corresponding Example was weighed and dissolved in a standard solution of ethylidene-G7pNP and α-glucodiase, buffered to pH 7.35 and was stirred for 4 minutes at 27° C. The absorbance at 405 nm was measured at 27° C. Using the absorbance value, the activity per gram of film was determined. Each film composition was tested in multiple replicates, and the average value is reported herein.

Colorimetric Measurement of Lipase Activity

The lipase used is known to hydrolyze p-nitrophenol-valerate (pNP-val). The hydrolysis cleaved the ester bond between valerate and p-nitrophenol (pNP). The intensity of the formed pNP was proportional to the lipase activity of the sample. The pNP was detected at 405 nm.

Lipase activity was determined relative to an enzyme standard. The standard was a sample of the raw lipase composition that was used to prepare the film composition. Standards were prepared at a pH of 7.70, were stirred for 4.2 minutes at 40° C., and the absorbance was measured at 405 nm. A calibration curve (linear) was obtained, as described above. A sample of enzyme-containing film of the corresponding Example was weighed and dissolved in a standard solution of pNP-val, buffered to pH 7.70 and was stirred for 4.2 minutes at 40° C. The absorbance at 405 nm was measured at 40° C. Using the absorbance value, the activity per gram of film was determined. Each film composition was tested in multiple replicates, and the average value is reported herein.

Example 1

A set of water-soluble films were prepared with the ingredients identified in the table and description below, in the amounts shown. Unless specified otherwise, amounts are in phr.

| Component | Chemical Name | Description | 1 | 2 |
|---|---|---|---|---|
| PVOH resin | PVOH | 88% hydrolyzed, viscosity 23.0-27.0 | 100 | 100 |
| Alpha-amylase (amylase activity/100 parts PVOH resin) | | Amylase Enzyme Mixture | 458 | 458 |
| Protease (protease activity/100 parts PVOH resin) | | Protease Enzyme Mixture | 759 | 759 |
| Pro-Fam 974 (phr) | Soy protein isolate | Protease substrate | 0.00 | 2.56 |
| Protease activity (% recovery) | | | 44 | 72 |
| Amylase activity (% recovery) | | | 115 | 116 |

Each film also included about 35 phr of plasticizers, 390 phr of water, and minor amounts of one or more processing aids which are not believed to affect enzyme recovery, e.g., antiblocking agents, surfactants, caustic soda, film formers, defoaming agents, antiyellowing agents, etc, in an amount totaling less than about 2.5 phr. The water soluble film according to formula 1 was prepared as follows. In a beaker, the processing aids and water were agitated for 10 minutes. The water-soluble resin was added to the mixture and the mixture was heated. The solution was left to boil for 30 minutes. The solution was degassed overnight in an oven at 65° C. The enzymes, plasticizers, and additional water were mixed into the solution at a temperature of no higher than 65° C. The mixture was stirred for 1 hour and the mixture according to formula 1 was immediately cast. The water soluble film according to formula 2 was prepared by the same procedure, with the exception of the addition of the soy protein protease substrate. The soy protein was introduced into the system with the processing aids and water.

The film was cast using a doctor blade onto a heated casting bed and dried for approximately 8 minutes at about 74° C. The resulting water soluble film was then removed from the casting bed, cut into sheets of about 8.5 in by 12 in (21.59 cm by 30.48 cm) and sealed into airtight bags for storage. The individual sheets were either placed into resealable zipper-style plastic bags, or into foil pouches with air gently pressed out, then heat sealed and stored in a 5° C. refrigerator until tested for activity.

The percent recoveries of the enzyme activity in the PVOH-based water-soluble films were determined as described above. The percent recovery of the enzymes is the percentage of the enzymes that remained active following the combination of mixing, casting, drying and storage processes. The water-soluble film that contained no enzyme substrate, film 1, demonstrated a 44% recovery of protease activity. The water-soluble film that contained a protease substrate, film 2, demonstrated a 72% recovery of protease activity. In this example, the inclusion of the protease substrate lead to a 63% increase in recovered protease activity.

Example 2

A set of water-soluble films were prepared with the ingredients identified in the table and description below, in the amounts shown. Unless specified otherwise, amounts are in phr.

| Component | Chemical Name | Description | 3 | 4 |
|---|---|---|---|---|
| PVOH resin | VOH/MA copolymer | PVOH >99% hydrolyzed; viscosity 17.0-23.0; 8.8-10.0 wt % MA | 100 | 100 |
| Alpha-amylase (amylase activity/100 parts PVOH resin) | | Amylase Enzyme Mixture | 458 | 458 |
| Protease (protease activity/100 parts PVOH resin) | | Protease Enzyme Mixture | 759 | 759 |
| Pro-Fam 974 (phr) | Soy protein isolate | Protease substrate | 0.00 | 2.60 |
| Protease activity (% recovery) | | | 41 | 84 |
| Amylase activity (% recovery) | | | 106 | 116 |

Each film also included about 35 phr of plasticizers, 400 phr of water, and minor amounts of one or more processing aids which are not believed to affect enzyme recovery, e.g., antiblocking agents, surfactants, caustic soda, film formers, defoaming agents, antiyellowing agents, etc, in an amount totaling less than about 6 phr. The procedure of Example 1 was followed. The percent recoveries of the enzyme activity in the vinyl alcohol/methyl acrylate copolymer-based water-soluble films were determined as described above. The water-soluble film that contained no enzyme substrate, film 3, demonstrated a 41% recovery of protease activity. The water-soluble film that contained a protease substrate, film 4, demonstrated an 84% recovery of protease activity. In this example, the inclusion of the protease substrate nearly doubled the % recovery of protease activity.

Example 3

A set of water-soluble films were prepared with the ingredients identified in the table and description below, in the amounts shown. Unless specified otherwise, amounts are in phr.

| Component | Chemical Name | Description | 5 | 6 |
|---|---|---|---|---|
| Modified PVOH resin | VOH/VA/ NaAMPS terpolymer | PVOH >95% hydrolyzed; viscosity 10.0-14.0; 4 mol% (total) VA and NaAMPS | 100 | 100 |

-continued

| Component | Chemical Name | Description | 5 | 6 |
|---|---|---|---|---|
| Alpha-amylase (amylase activity/100 parts PVOH resin) | | Amylase Enzyme Mixture | 458 | 458 |
| Protease (protease activity/100 parts PVOH resin) | | Protease Enzyme Mixture | 759 | 759 |
| Pro-Fam 974 (phr) | Soy protein isolate | Protease substrate | 0.00 | 2.56 |
| Protease activity (% recovery) | | | 87 | 99 |
| Amylase activity (% recovery) | | | 115 | 113 |

Each film also included about 35 phr of plasticizers, 390 phr of water, and minor amounts of one or more processing aids which are not believed to affect enzyme recovery, e.g., antiblocking agents, surfactants, caustic soda, film formers, defoaming agents, antiyellowing agents, etc, in an amount totaling less than about 2.5 phr. The procedure of Example 1 was followed. The percent recoveries of the enzyme activity in the vinyl alcohol/vinyl acetate/acrylamido-2-methylpropanesulfonate terpolymer-based water-soluble films were determined as described above. The water-soluble film that contained no enzyme substrate, film 5, demonstrated an 87% recovery of protease activity. The water-soluble film that contained a protease substrate, film 6, demonstrated a 99% recovery of protease activity. In this example, the inclusion of the protease substrate lead to a 14% increase in recovered protease activity.

Example 4

A set of water-soluble films were prepared with the ingredients identified in the table and description below, in the amounts shown. Unless specified otherwise, amounts are in phr.

| Component | Chemical Name | Description | 7 | 8 |
|---|---|---|---|---|
| Modified PVOH | VOH/VA/ NaMMM terpolymer | PVOH 89-93% hydrolyzed; viscosity 21.0-26.0; 2 mol% (total) VA and NaMMM | 100 | 100 |
| Alpha-amylase (amylase activity/100 parts PVOH resin) | | Amylase Enzyme Mixture | 458 | 458 |
| Protease (protease activity/100 parts PVOH resin) | | Protease Enzyme Mixture | 759 | 759 |
| Pro-Fam 974 (phr) | Soy protein isolate | Protease substrate | 0.00 | 2.56 |

-continued

| Component | Chemical Name | Description | 7 | 8 |
|---|---|---|---|---|
| Protease activity (% recovery) | | | 79 | 83 |
| Amylase activity (% recovery) | | | 116 | 113 |

Each film also included about 35 phr of plasticizers, 390 phr of water, and minor amounts of one or more processing aids which are not believed to affect enzyme recovery, e.g., antiblocking agents, surfactants, caustic soda, film formers, defoaming agents, antiyellowing agents, etc, in an amount totaling less than about 2.5 phr. The procedure of Example 1 was followed. The percent recoveries of the enzyme activity in the vinyl alcohol/vinyl acetate/monomethylmaleate terpolymer-based water-soluble films were determined as described above. The water-soluble film that contained no enzyme substrate, film 7, demonstrated a 79% recovery of protease activity. The water-soluble film that contained a protease substrate, film 8, demonstrated an 83% recovery of protease activity. In this example, the inclusion of the protease substrate lead to a 5% increase in recovered protease activity.

Example 5

A set of water-soluble films were prepared with the ingredients identified in the table and description below, in the amounts shown. Unless specified otherwise, amounts are in phr.

| Component | Chemical Name | Description | 9 | 10 |
|---|---|---|---|---|
| Modified PVOH | VOH/VA/ NaMMM terpolymer | PVOH 89-93% hydrolyzed; viscosity 21.0-26.0; 2 mol% (total) VA and NaMMM | 100 | 100 |
| Alpha-amylase (amylase activity/100 parts PVOH resin) | | Amylase Enzyme Mixture | 358 | 358 |
| Protease (protease activity/100 parts PVOH resin) | | Protease Enzyme Mixture | 520 | 520 |
| Pro-Fam 974 (phr) | Soy protein isolate | Protease substrate | 0.00 | 2.33 |
| Protease activity (% recovery) | | | 41 | 103 |
| Amylase activity (% recovery) | | | 110 | 111 |

Each film also included about 25 phr of plasticizers, 380 phr of water, and minor amounts of one or more processing aids which are not believed to affect enzyme recovery, e.g., antiblocking agents, surfactants, caustic soda, film formers, defoaming agents, antiyellowing agents, etc, in an amount totaling less than about 4 phr. The procedure of Example 1 was followed. The percent recoveries of the enzyme activity in the vinyl alcohol/vinyl acetate/monomethylmaleate terpolymer-based water-soluble films were determined as described above. The water-soluble film that contained no enzyme substrate, film 9, demonstrated a 41% recovery of protease activity. The water-soluble film that contained a protease substrate, film 10, demonstrated a nominal 103% recovery of protease activity. In this example, the inclusion of the protease substrate lead to an increase in recovered protease activity of about 240%.

Example 6

A set of water-soluble films were prepared with the ingredients identified in the table and description below, in the amounts shown. Unless specified otherwise, amounts are in phr.

| Component | Chemical Name | Description | 11 | 12 |
|---|---|---|---|---|
| PVOH resin | PVOH | 88% hydrolyzed, viscosity 23.0-27.0 | 100 | 100 |
| Lipase (lipase activity/100 parts PVOH resin) | | Lipase Enzyme Mixture | 2507 | 2507 |
| Protease (protease activity/100 parts PVOH resin) | | Protease Enzyme Mixture | 1935 | 1935 |
| Glycerol Monooleate (phr) | Lipid | Lipase substrate | 0.00 | 2.67 |
| Protease activity (% recovery) | | | 89 | 89 |
| Lipase activity (% recovery) | | | 0 | 22 |

Each film also included about 35 phr of plasticizers, 410 phr of water, and minor amounts of one or more processing aids which are not believed to affect enzyme recovery, e.g., antiblocking agents, surfactants, caustic soda, film formers, defoaming agents, antiyellowing agents, etc, in an amount totaling less than about 4 phr. The procedure of Example 1 was followed. The percent recoveries of the enzyme activity in the PVOH-based water-soluble films were determined as described above. The water-soluble film that contained no enzyme substrate, film 11, demonstrated no recovery of lipase activity. The water-soluble film that contained a lipase substrate, film 12, demonstrated a 22% recovery of lipase activity. In this example, the inclusion of the lipase substrate surprisingly lead to recovery of active lipase in a substantial amount. Protease recovery was not affected. Without intending to be bound by any particular theory, it is believed that the lipase was serving as an enzyme substrate for stabilization against protease self-degradation.

Example 7

In the examples below, the conditions to which the enzymes are exposed during mixing can affect the activity of the enzymes in the final composition, such as a film. A set of water-soluble films were prepared with the ingredients identified in the table and description below, in the amounts shown. Unless specified otherwise, amounts are in phr.

| Component | Chemical Name | Description | 13 A | 13 B |
|---|---|---|---|---|
| Modified PVOH resin | VOH/VA/ NaMMM terpolymer | PVOH 89-93% hydrolyzed; viscosity 21.0-26.0; 2 mol% (total) VA and NaMMM | 100 | 100 |
| Alpha-amylase (amylase activity/100 parts PVOH resin) | | Amylase Enzyme Mixture | 358 | 358 |
| Protease (protease activity/100 parts PVOH resin) | | Protease Enzyme Mixture | 520 | 520 |
| Pro-Fam 974 (phr) | Soy protein isolate | Protease substrate | 2.33 | 2.33 |
| Protease activity (% recovery) | | | 103 | 1 |
| Amylase activity (% recovery) | | | 111 | 93 |

The film also included about 25 phr of plasticizers, 380 phr of water, and minor amounts of one or more processing aids which are not believed to affect enzyme recovery, e.g., antiblocking agents, surfactants, caustic soda, film formers, defoaming agents, antiyellowing agents, etc, in an amount totaling less than about 4 phr.

Method A

In a beaker, the processing aids, soy protein, and water were agitated for 10 minutes. The vinyl alcohol/vinyl acetate/monomethylmaleate terpolymer was added to the mixture and the mixture was heated. The solution was left to boil for 30 minutes. The solution was degassed overnight in an oven at 65° C. The enzymes, plasticizers, and additional water were mixed into the solution at a temperature of no higher than 65° C. The mixture was stirred for 1 hour and the mixture according to formula 13 was immediately cast to form water-soluble film A.

Comparative Method B

In a beaker, the enzymes, plasticizers, processing aids, soy protein, and water were agitated for 10 minutes. The vinyl alcohol/vinyl acetate/monomethylmaleate terpolymer was added to the mixture and the mixture was heated. The solution was left to boil for 30 minutes. The solution was degassed overnight in an oven at 65° C. The mixture according to formula 13 was cast to form water-soluble film B.

The films were cast using a doctor blade onto a heated casting bed and dried for approximately 8 minutes at about 74° C. The resulting water soluble film, nominally 3 mil (0.076 mm) thick, was then removed from the casting bed, cut into sheets of about 8.5 in by 12 in (21.59 cm by 30.48 cm) and sealed into airtight bags for storage. The individual sheets were either placed into resealable zipper-style plastic bags, or into foil pouches with air gently pressed out, then heat sealed and stored in a 5° C. refrigerator until tested for activity.

The percent recoveries of the enzyme activity in the water-soluble films were determined as described above. Method A resulted in a water-soluble film that demonstrated a nominal 103% recovery of protease activity and a nominal 111% recovery of amylase activity. In contrast, the water-soluble film prepared according to Method B demonstrated a 1% recovery of protease activity and a 93% recovery of amylase activity. These Examples demonstrate that mixing the enzymes into the water-soluble mixture immediately before casting results in a higher enzyme activity in the resulting water-soluble film compared to the water-soluble films formed by mixing in the enzymes early in the mixing process and therefore exposing the enzymes to extreme heating conditions, particularly for protease enzymes.

Example 8

In the examples below, the method of drying the water-soluble films can affect the enzyme activity of the resulting films. A set of water-soluble films were prepared with the ingredients identified in the table and description below, in the amounts shown. Unless specified otherwise, amounts are in phr.

| Component | Chemical Name | Description | 14 (Drying conditions 1) | 14 (Drying conditions 2) | 14 (Drying conditions 3) |
|---|---|---|---|---|---|
| Modified PVOH | VOH/VA/ NaMMM terpolymer | PVOH 89-93% hydrolyzed; viscosity 21.0-26.0; 2 mol % (total) VA and NaMMM | 100 | 100 | 100 |
| Alpha-amylase (amylase activity/ 100 parts PVOH resin) | | Amylase Enzyme Mixture | 358 | 358 | 358 |
| Protease (protease activity/ 100 parts PVOH resin) | | Protease Enzyme Mixture | 520 | 520 | 520 |
| Protease activity (% recovery) | | | 41 | 19 | 1 |
| Amylase activity (% recovery) | | | 110 | 103 | 15 |

The film also included about 25 phr of plasticizers, 380 phr of water, and minor amounts of one or more processing aids which are not believed to affect enzyme recovery, e.g., antiblocking agents, surfactants, caustic soda, film formers, defoaming agents, antiyellowing agents, etc, in an amount totaling less than about 4 phr. The films were prepared as described in Method A of Example 7. The films were cast using a doctor blade and dried under three different conditions.

Drying Conditions 1

The film was cast onto a casting bed that was pre-heated to 165° F. (74° C.) and dried for approximately 8 minutes at about 74° C.

Drying Conditions 2 (Ambient)

The water-soluble film mixture was cast onto Mylar film at ambient conditions. The water-soluble film mixture was then dried at ambient lab conditions (from about 20° C. to about 25° C.) for 16 hours.

Drying Conditions 3 (Harsh)

The film was cast onto a casting bed that was pre-heated to 200° F. (94° C.) and dried for approximately 45 minutes at 94° C.

The percent recoveries of the enzymes in the water-soluble films were determined as described above. The results are reproduced in the table below.

| Drying Conditions | Protease (% recovery) | Amylase (% recovery) |
|---|---|---|
| 1 | 41 | 110 |
| 2 | 19 | 103 |
| 3 | 1 | 15 |

The results show that the activities of the enzymes in the resulting water-soluble film were greatly improved when the film was dried under the moderate conditions described herein, relative to drying under mild ambient conditions or harsh conditions. Also advantageously, the time that the film was exposed to heat was minimized.

Throughout this specification and the claims which follow, unless the context requires otherwise, the word "comprise" and variations such as "comprises" and "comprising" will be understood to imply the inclusion of a stated integer or step or group of integers or steps but not the exclusion of any other integer or step or group of integers or steps.

Throughout the specification, where compositions are described as including components or materials, it is contemplated that the compositions can also consist essentially of, or consist of, any combination of the recited components or materials, unless described otherwise. The invention illustratively disclosed herein suitably may be practiced in the absence of any element or step which is not specifically disclosed herein.

The practice of a method disclosed herein, and individual steps thereof, can be performed manually and/or with the aid of or automation provided by electronic equipment. Although processes have been described with reference to particular embodiments, a person of ordinary skill in the art will readily appreciate that other ways of performing the acts associated with the methods may be used. For example, the order of the various steps may be changed without departing from the scope or spirit of the method, unless described otherwise. In addition, some of the individual steps can be combined, omitted, or further subdivided into additional steps.

What is claimed:

1. A water soluble film, comprising a water soluble mixture of:

a water soluble resin, an enzyme selected from the group consisting of cellulase and mannanase, and an enzyme substrate for said enzyme; wherein when the enzyme is a cellulase, the enzyme substrate is selected from the group consisting of a cellulose and methyl cellulose; and when the enzyme is a mannanase, the substrate is selected from the group consisting of a mannan and guar gum; and wherein the enzyme substrate is not the same as the water soluble resin.

2. The water soluble film according to claim 1, wherein the water soluble resin consists of a vinyl alcohol/vinyl acetate/methyl acrylate terpolymer.

3. The water soluble film according to claim 1, further comprising a second enzyme in the film.

4. The water soluble film according to claim 1, wherein the total amount of enzyme included in the water soluble film is at least about 0.1 phr.

5. The water soluble film according to claim 1, wherein the enzyme substrate is present in the film in an amount of at least about 2 phr to about 8 phr.

6. The water soluble film according to claim 1, wherein the water soluble resin is selected from the group consisting of polyvinyl alcohol, modified polyvinyl alcohols, water-soluble acrylate copolymers, polyacrylates, polyacryamides, polyvinyl pyrrolidone, pullulan, guar gum, xanthan gum, carrageenan, starch, ethoxylated starch, hydroxypropylated starch, poly(sodium acrylamido-2-methylpropane sulfonate), copolymers thereof, and combinations of any of the forgoing.

7. The water soluble film according claim 6, wherein the water soluble resin is present in the water soluble film in an amount of at least about 35 wt % to about 90 wt %, based on the total weight of the film.

8. The water soluble film according to claim 1, further comprising a plasticizer.

9. The water soluble film according to claim 8, wherein the plasticizer is selected from the group consisting of sorbitol, glycerol, diglycerol, propylene glycol, ethylene glycol, diethyleneglycol, triethylene glycol, tetraethyleneglycol, polyethylene glycols up to MW 400, 2 methyl-1,3-propanediol, lactic acid, monoacetin, triacetin, triethyl citrate, 1,3-butanediol, trimethylolpropane (TMP), polyether triol, and combinations thereof.

10. The water soluble film according to claim 9, wherein the plasticizer or combination of plasticizers is present in an amount of at least about 25 phr.

11. The water soluble film according to claim 1, further comprising a surfactant.

12. The water soluble film according to claim 11, wherein the surfactant is selected from the group consisting dialkyl sulfosuccinate, lactylated fatty acid esters of glycerol and propylene glycol, lactylic esters of fatty acids, sodium alkyl sulfates, polysorbate 20, polysorbate 60, polysorbate 65, polysorbate 80, alkyl polyethylene glycol ethers, lecithin, acetylated fatty acid esters of glycerol and propylene glycol, sodium lauryl sulfate, acetylated esters of fatty acids, myristyl dimethylamine oxide, trimethyl tallow alkyl ammonium chloride, quaternary ammonium compounds, salts thereof, and combinations of any of the forgoing.

13. The water soluble film according to claim 11, wherein the surfactant is present in the water soluble film in an amount of at least about 0.05 phr.

14. The water soluble film according to claim 1, wherein the enzyme activity recovery in the film after formation is at least 70% of the original enzyme activity in the enzyme composition raw material used to make the film.

15. A method of forming a water soluble film, comprising providing a solution comprising a water soluble resin, an enzyme selected from the group consisting of cellulase and mannanase, and an enzyme substrate for said enzyme; wherein when the enzyme is a cellulase, the enzyme substrate is selected from the group consisting of a cellulose and methyl cellulose; and when the enzyme is a mannanase, the substrate is selected from the group consisting of a mannan and guar gum;

casting the solution onto a surface preheated to a temperature less than 77° C.;

drying the water from the cast solution over a period of less than 24 hours, to form a water soluble film.

16. The water soluble film according to claim 3, wherein the second enzyme is different from the first enzyme and is selected from the group consisting of amylase, lipase, protease, oxido-reductase, cellulase, mannanase, and combinations thereof.

17. A water soluble film, the film comprising a water soluble mixture of:

a water soluble resin, an enzyme selected from the group consisting of cellulase and mannanase, and an enzyme substrate for said enzyme; wherein when the enzyme is a cellulase, the enzyme substrate is selected from the group consisting of a cellulose and methyl cellulose;

and when the enzyme is a mannanase, the substrate is selected from the group consisting of a mannan and guar gum;

wherein the enzyme substrate is not the same as the water soluble resin, and wherein the film exhibits an increase in enzyme recovery relative to a like film with no enzyme substrate included.

18. The water soluble film according to claim 6, wherein the water soluble resin comprises one or more selected from the group consisting of polyvinyl alcohol and modified polyvinyl alcohols.

* * * * *